(12) United States Patent
Lee et al.

(10) Patent No.: US 10,986,175 B2
(45) Date of Patent: Apr. 20, 2021

(54) KEY ESTABLISHMENT FOR COMMUNICATIONS WITHIN A GROUP

(71) Applicant: QUALCOMM Incorporated, San Diego, CA (US)

(72) Inventors: Soo Bum Lee, San Diego, CA (US); Gavin Bernard Horn, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 243 days.

(21) Appl. No.: 15/190,128

(22) Filed: Jun. 22, 2016

(65) Prior Publication Data

US 2017/0202046 A1 Jul. 13, 2017

Related U.S. Application Data

(60) Provisional application No. 62/278,355, filed on Jan. 13, 2016.

(51) Int. Cl.
*H04W 12/04* (2021.01)
*H04L 29/08* (2006.01)
(Continued)

(52) U.S. Cl.
CPC ............ *H04L 67/104* (2013.01); *H04L 9/085* (2013.01); *H04L 9/0819* (2013.01);
(Continued)

(58) Field of Classification Search
None
See application file for complete search history.

(56) References Cited

U.S. PATENT DOCUMENTS

| 7,234,058 B1* | 6/2007 | Baugher | ............... | H04L 9/0833 380/259 |
|---|---|---|---|---|
| 7,234,063 B1* | 6/2007 | Baugher | ............... | H04L 9/0833 380/259 |

(Continued)

FOREIGN PATENT DOCUMENTS

| CN | 101114901 A | 1/2008 |
|---|---|---|
| CN | 103051601 A | 4/2013 |

(Continued)

OTHER PUBLICATIONS

ISA/EP, International Search Report and Written Opinion of the International Searching Authority, Int'l Application No. PCT/US2016/066191, dated Jul. 7, 2017, European Patent Office, Rijswijk, NL, 14 pgs.

(Continued)

*Primary Examiner* — Ajit Patel
*Assistant Examiner* — Pamit Kaur
(74) *Attorney, Agent, or Firm* — Holland & Hart LLP

(57) ABSTRACT

Methods, systems, and devices for wireless communication are described. A managing device may create a group security configuration for each device of a group of devices managed by the managing device. The group security configuration may include a group security parameter associated with the group of devices and a device-specific security parameter associated with each device in the group of devices. The managing device may provide the group security configuration to one or more devices of the group of devices. The one or more devices may use the group security configuration to directly establish a secure connection for communications between the one or more devices, which may include an establishment of the secure connection without further communications with the managing device during the establishment.

28 Claims, 12 Drawing Sheets

(51) Int. Cl.

| | | |
|---|---|---|
| *H04W 4/08* | (2009.01) | |
| *H04L 9/08* | (2006.01) | |
| *H04L 9/32* | (2006.01) | |
| *H04L 29/06* | (2006.01) | |
| *H04W 4/70* | (2018.01) | |
| *H04W 76/15* | (2018.01) | |
| *H04W 76/14* | (2018.01) | |
| *H04W 12/00* | (2021.01) | |
| *H04W 84/18* | (2009.01) | |

(52) U.S. Cl.
CPC .......... *H04L 9/0833* (2013.01); *H04L 9/0838* (2013.01); *H04L 9/0861* (2013.01); *H04L 9/321* (2013.01); *H04L 63/061* (2013.01); *H04L 63/062* (2013.01); *H04L 63/065* (2013.01); *H04W 4/08* (2013.01); *H04W 4/70* (2018.02); *H04W 12/003* (2019.01); *H04W 12/04* (2013.01); *H04W 76/14* (2018.02); *H04W 76/15* (2018.02); *H04W 84/18* (2013.01)

(56) References Cited

U.S. PATENT DOCUMENTS

| | | | |
|---|---|---|---|
| 7,900,250 B1 | 3/2011 | Fedyk et al. | |
| 8,547,910 B2 | 10/2013 | Chakrabarti et al. | |
| 8,983,066 B2 * | 3/2015 | Kruys | H04L 9/0833 380/44 |
| 9,100,382 B2 | 8/2015 | Benoit et al. | |
| 2010/0220856 A1 * | 9/2010 | Kruys | H04L 9/0833 380/44 |
| 2011/0211693 A1 * | 9/2011 | Carvalho | H04L 63/065 380/200 |
| 2013/0148158 A1 | 6/2013 | Kanakubo | |
| 2015/0381577 A1 * | 12/2015 | Reitsma | H04L 63/0428 713/168 |
| 2016/0165410 A1 * | 6/2016 | Purohit | H04W 4/08 370/311 |

FOREIGN PATENT DOCUMENTS

| | | |
|---|---|---|
| WO | WO-2009158050 A2 | 12/2009 |
| WO | WO-2013142606 A1 | 9/2013 |

OTHER PUBLICATIONS

Granjal J., et al., "Security for the Internet of Things: a Survey of Existing Protocols and Open Research Issues," IEEE Communication Surveys & Tutorials, Third Quarter 2015, Retrieved dated on Oct. 5, 2016, Retrieved from the Internet URL: https://www.researchgate.net/publication/272641092 , vol. 17 (3), pp. 1294-1312.

Heer T., et al., "Security Challenges in the IP-based Internet of Things," Wireless Personal Communications, Dec. 2011, Retrieved dated on Nov. 5, 2016, Retrieved from the Internet URL: https://www.researchgate.net/publication/225738726 , pp. 1-16.

Keoh S.L., et al., "Securing the Internet of Things: a Standardization Perspective," IEEE Internet of Things Journal, Jun. 2014, Retrieved dated on Nov. 5, 2016, Retrieved from the Internet URL: http://www.researchgate.net.publication/263128758, pp. 1-12.

Roman R., et al., "Key Management Systems for Sensor Networks in the Context of Internet of Things," Computers and Electrical Engineering, 2011, vol. 37 pp. 147-159.

Veltri L., et al., "A Novel Batch-based Group Key Management Protocol Applied to the Internet of Things," Ad Hoc Networks, 2013, pp. 1-14.

* cited by examiner

KEY ESTABLISHMENT FOR COMMUNICATIONS WITHIN A GROUP

CROSS REFERENCES

The present application for patent claims priority to U.S. Provisional Patent Application No. 62/278,355 by Lee, et al., entitled "KEY ESTABLISHMENT FOR COMMUNICATIONS WITHIN A GROUP," filed Jan. 13, 2016, assigned to the assignee hereof.

BACKGROUND

The following relates generally to wireless communication, and more specifically to key establishment for communication within a group.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless communication links may also be established between UEs in a configuration known as device-to-device (D2D) communications. One or more of a group of UEs utilizing D2D communications may be within the coverage area of a cell. Other UEs in such a group may be outside the coverage area of a cell, or otherwise unable to receive transmissions from a base station. In some cases, a base station facilitates the scheduling of resources for D2D communications. In other cases, D2D communications are carried out independent of a base station.

In some cases, a set of devices (e.g., wearable devices, sensors, UEs, base stations, access points, etc.) may belong to a common group. For example, the devices in the group may be sensors in a sensor array, a set of internet-of-everything (IoE) devices owned by a person, a set of smart home appliances within a home, etc. The group of devices may be managed by a managing device (e.g., a device associated with an owner of the group). The devices within the group may wirelessly communicate with the managing device and also to each other (e.g., D2D communications for multi-hop connectivity). For example, one device may access the internet via another group device that is three hops away, where each hop is another device within the group. The connections between the devices, however, may use current link security techniques which may not scale as the size of the group increases, may not be efficient in terms of energy and message exchanges required to secure the link, etc.

SUMMARY

The described techniques generally relate to improved methods, systems, or devices that support scalable and efficient key establishment for communications within a group. Generally, the described techniques provide for a managing device to create and distribute, to each group device, a group security configuration that is unique to each device and yet is used between devices to establish a secure connection. The group security configuration may include a group-specific feature and a device-specific feature. The group-specific feature may be a group security parameter associated with the group of devices and known by all group devices. The device-specific feature may be a device-specific security parameter associated with a particular device in the group and known by only the managing device and the respective group device. The group security parameter may include a configurable security feature where a predetermined number of group devices must be compromised to break the security of the group. A managing device may trigger a change or update to a group security parameter based at least in part on the predetermined number of devices (e.g., when a determined quantity of devices with a change of connection status and/or device security compromise reaches or exceeds a threshold number of devices). Additionally of alternatively, in some examples a managing device may trigger a change or update to a group security parameter based on determining that a single device has been compromised. The devices of the group may use their respective group security configuration to directly establish a secure connection (e.g., a pairwise connection) with other devices of the group without further communications from the managing device during the establishment of the secure connection. This may support intra-group secure communications between group devices during periods where the managing device is unavailable or offline.

A method for wireless communication is described. The method may include: creating, by a managing device of a group of devices, a first group security configuration for a first device of the group of devices, the first group security configuration comprising a group security parameter associated with the group of devices and a device-specific security parameter associated with the first device; creating, by the managing device, a second group security configuration for a second device of the group of devices, the second group security configuration comprising the group security parameter and a device-specific security parameter associated with the second device; and providing the first group security configuration to the first device and the second group security configuration to the second device, wherein the first group security configuration and the second group security configuration are configured to be used to establish a secure connection for communications between the first device and the second device.

An apparatus for wireless communication is described. The apparatus may include a processor, memory in electronic communication with the processor, and instructions stored in the memory. The instructions may be operable, when executed by the processor, to cause the apparatus to: create, by a managing device of a group of devices, a first group security configuration for a first device of the group of devices, the first group security configuration comprising a group security parameter associated with the group of devices and a device-specific security parameter associated with the first device; create, by the managing device, a second group security configuration for a second device of the group of devices, the second group security configuration comprising the group security parameter and a device-specific security parameter associated with the second device; and provide the first group security configuration to the first device and the second group security configuration to the second device, wherein the first group security configuration and the second group security configuration are configured to be used to establish a secure connection for communications between the first device and the second device.

Another apparatus for wireless communication is described. The apparatus may include: means for creating, by a managing device of a group of devices, a first group security configuration for a first device of the group of devices, the first group security configuration comprising a group security parameter associated with the group of devices and a device-specific security parameter associated with the first device; means for creating, by the managing device, a second group security configuration for a second device of the group of devices, the second group security configuration comprising the group security parameter and a device-specific security parameter associated with the second device; and means for providing the first group security configuration to the first device and the second group security configuration to the second device, wherein the first group security configuration and the second group security configuration are configured to be used to establish a secure connection for communications between the first device and the second device.

A non-transitory computer-readable medium storing code for wireless communication is described. The code may include instructions executable to: create, by a managing device of a group of devices, a first group security configuration for a first device of the group of devices, the first group security configuration comprising a group security parameter associated with the group of devices and a device-specific security parameter associated with the first device; create, by the managing device, a second group security configuration for a second device of the group of devices, the second group security configuration comprising the group security parameter and a device-specific security parameter associated with the second device; and provide the first group security configuration to the first device and the second group security configuration to the second device, wherein the first group security configuration and the second group security configuration are configured to be used to establish a secure connection for communications between the first device and the second device.

In some examples of the method, apparatuses, or non-transitory computer-readable medium, the first group security configuration and the second group security configuration may be configured to be used to establish the secure connection without additional communications with the managing device during the establishment of the secure connection.

Some examples of the method, apparatuses, or non-transitory computer-readable medium may include operations, features, means, or instructions for: determining a group security level for the group of devices based at least in part on a maximum number of devices in the group of devices.

Some examples of the method, apparatuses, or non-transitory computer-readable medium may include operations, features, means, or instructions for: updating the first group security configuration and the second group security configuration based at least in part on a quantity of devices that change their group connection status exceeding a threshold quantity of devices.

Some examples of the method, apparatuses, or non-transitory computer-readable medium may include operations, features, means, or instructions for: providing the updated first group security configuration to the first device using a first secure unicast channel; and providing the updated second group security configuration to the second device using a second secure unicast channel.

In some examples of the method, apparatuses, or non-transitory computer-readable medium, the updating may include operations, features, means, or instructions for: changing the group security parameter, the device-specific security parameter associated with the first device, or the device-specific security parameter associated with the second device, or a combination thereof.

In some examples of the method, apparatuses, or non-transitory computer-readable medium, the updating may include operations, features, means, or instructions for: selecting a group identifier providing an index to an updated group security parameter, an updated device-specific security parameter associated with the first device, or an updated device-specific security parameter associated with the second device, or a combination thereof; and providing the selected group identifier to the first device, or the second device, or both the first device and the second device.

In some examples of the method, apparatuses, or non-transitory computer-readable medium, a device changing its group connection status may include the device being identified as a compromised device, a periodic security configuration update, the device departing from the group of devices, or the device joining the group of devices, or a combination thereof.

In some examples of the method, apparatuses, or non-transitory computer-readable medium, the group of devices may include a group of sensor nodes, a group of wireless devices forming a wireless peer-to-peer (P2P) network, a group of wireless devices forming a mesh network, or a group of devices forming an infrastructure-less network, or a combination thereof.

A method of wireless communication is described. The method may include: receiving, at a first device of a group of devices, a first group security configuration from a managing device, the first group security configuration comprising a group security parameter associated with the group of devices and a device-specific security parameter associated with the first device; and establishing a secure connection for communications with a second device of the group of devices based at least in part on the first group security configuration and a second group security configuration provided to the second device, the second group security configuration comprising the group security parameter and a device-specific parameter associated with the second device.

An apparatus for wireless communication is described. The apparatus may include a processor, memory in electronic communication with the processor, and instructions stored in the memory. The instructions may be executable by the processor to cause the apparatus to: receive, at a first device of a group of devices, a first group security configuration from a managing device, the first group security configuration comprising a group security parameter associated with the group of devices and a device-specific security parameter associated with the first device; and establish a secure connection for communications with a second device of the group of devices based at least in part on the first group security configuration and a second group security configuration provided to the second device, the second group security configuration comprising the group security parameter and a device-specific parameter associated with the second device.

Another apparatus for wireless communication is described. The apparatus may include: means for receiving, at a first device of a group of devices, a first group security configuration from a managing device, the first group security configuration comprising a group security parameter associated with the group of devices and a device-specific security parameter associated with the first device; and means for establishing a secure connection for communications with a second device of the group of devices based at least in part on the first group security configuration and a second group security configuration provided to the second device, the second group security configuration comprising the group security parameter and a device-specific parameter associated with the second device.

A non-transitory computer-readable medium storing code for of wireless communication is described. The code may include instructions executable to: receive, at a first device of a group of devices, a first group security configuration from a managing device, the first group security configuration comprising a group security parameter associated with the group of devices and a device-specific security parameter associated with the first device; and establish a secure connection for communications with a second device of the group of devices based at least in part on the first group security configuration and a second group security configuration provided to the second device, the second group security configuration comprising the group security parameter and a device-specific parameter associated with the second device.

In some examples of the method, apparatuses, or non-transitory computer-readable medium, the secure connection may be established without additional communications with the managing device during the establishment of the secure connection.

Some examples of the method, apparatuses, or non-transitory computer-readable medium may include operations, features, means, or instructions for: generating, based at least in part on the first group security configuration and the second group security configuration, a pairwise key to establish the secure connection, the pairwise key being symmetric between the first device and the second device.

Some examples of the method, apparatuses, or non-transitory computer-readable medium may include operations, features, means, or instructions for: determining, at the first device, the device-specific security parameter associated with the second device, wherein establishing the secure connection is based at least in part on the device-specific security parameter associated with the second device as determined at the first device.

In some examples of the method, apparatuses, or non-transitory computer-readable medium, determining the device-specific security parameter associated with the second device may include operations, features, means, or instructions for: receiving a broadcast message from the second device, the broadcast message including the device-specific security parameter associated with the second device.

Some examples of the method, apparatuses, or non-transitory computer-readable medium may include operations, features, means, or instructions for: receiving an updated first group security configuration; and reestablishing the secure connection for communications with the second device based at least in part on the updated first group security configuration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Existing security techniques for D2D security may include a generic bootstrapping architecture or an authentication and key agreement protocol that support certificate-based and symmetric key-based configurations. A certificate-based configuration is generally associated with certificate management difficulties where a common certificate must be managed between devices (e.g., a certificate authority, a certificate revocation list, etc.). While this configuration may be scalable, it is also associated with high communications and processing requirements between the devices. A symmetric key-based configuration is generally associated with a trusted party that manages and distributes the key among the devices. This approach is also generally associated with a high provisioning cost.

Aspects of the disclosure are initially described in the context of a wireless communications system. The described techniques relate to improved systems, methods, and/or devices for key establishment for communications within a group. A managing device may create a group security configuration for each device of the group. The group security configuration may include a group-specific feature or parameter and a device-specific feature or parameter. A group security parameter may be a group-specific feature known by each device in the group and a device-specific security parameter may be a device-specific feature unique to each respective device. The managing device may provide, via a secure connection, the group security configuration to each group device individually. The group devices may receive and use their respective group security configuration to establish secure connections with other devices for communications. The managing device may manage the group security configurations and provide for updates, changes, etc. Aspects of the disclosure are further illustrated by and described with reference to apparatus diagrams, system diagrams, and flowcharts that relate to key establishment for communication within a group.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
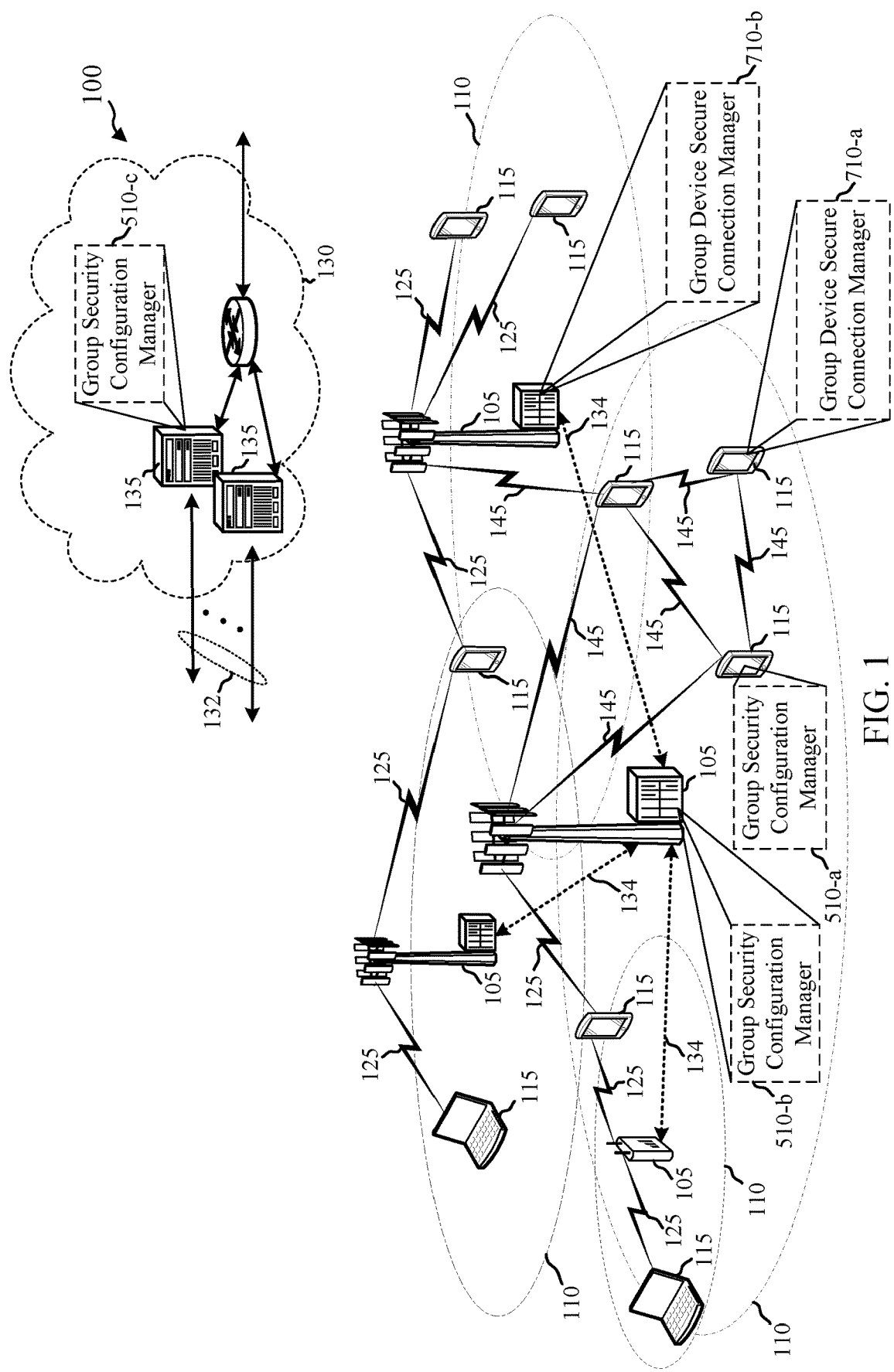
FIG. 1 illustrates an example of a wireless communications system that supports key establishment for communication within a group, in accordance with aspects of the present disclosure.

FIG. 1 illustrates an example of a wireless communications system 100 that supports key establishment for communications within a group, in accordance with various aspects of the present disclosure. The wireless communications system 100 includes base stations 105, UEs 115, and a core network 130 with core network devices 135. In some examples, the wireless communications system 100 may be a Long Term Evolution (LTE)/LTE-Advanced (LTE-A) network. Various devices (e.g., UEs 115, base station 105, access points, sensor nodes, smart appliances, etc.) may belong to a group of devices. A group of devices may have a logical connection between them (e.g., IoE devices owned by the same person, sensor nodes within a sensor array, UEs 115 belonging to a mesh network, etc.). Devices within the group may be mobile, may be stationary, or the group may include both mobile and stationary devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Wireless communications system 100 may also include device-to device (D2D) communications links 145, which may include communications links of a wireless mesh network, a peer-to-peer network, and the like. In various examples D2D communications links 145 may, for example, include a wireless communication link that does or does not involve a base station or other central communications device and/or controller. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, an appliance, an automobile, an Internet of things (IoT) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

The wireless communications system 100 may support key establishment for communications within the group wherein the group devices may not be required to communicate with a managing device to establish a connection with another group device for communications. For example, the group of devices may be managed by a managing device that includes a group security configuration manager 510 (e.g., a UE 115 associated with an owner having a group security configuration manager 510-a, or a network node (e.g., a radio access network (RAN) node or a core network (CN) node) having a group security configuration manager 510-b, or a core network device 135 having a group security configuration manager 510-c for providing remote management by a service provider, etc.). The managing device may create and provide group security configurations to the respective group devices. The group security configurations may include a group-specific feature and a device-specific feature, the combination of which may be configured to support a direct establishment of secure connections between the group devices. The group devices may include a group device secure connection manager 710 (e.g., a UE 115 having a group device secure connection manager 710-a, a base station 105 having a group device secure connection manager 710-b, etc.), that supports establishing secure connections between group devices. In various examples the secure connections may support direct communications, communications via one or more intermediary group devices (e.g., multi-hop communications), etc. The secure connections between group devices may be established based at least in part on group security configurations received from a managing device by respective group devices, and may be directly established without further communication with the managing device during the establishment of the secure connection.

Aspects of the described techniques support key establishment between devices that belong to a group of devices. In this context, it is to be understood that the term "device" may refer to a UE 115, a base station 105, a wireless access point (AP) associated with a Wi-Fi network, a wearable device, an IoE device, a sensor node, an actuator device, devices in a mesh network, smart appliances, and the like. Some devices may be a fixed device, or a mobile, or a devices that is fixed or mobile at different times. The devices may support wireless communications. The devices may communicate wirelessly using cellular technology (e.g., LTE/LTE-A), using Wi-Fi technology (e.g., Wi-Fi networks conforming to the 802.11 family of standards), Bluetooth technology, near field communications (NFC) technology, and/or similar wireless technologies. The devices may communicate wirelessly using a variety of such technologies. The group of devices may include different types of devices (e.g., sensor node devices) connected to a UE 115, which in various examples may include a connection via an access point (AP) and/or base station 105. Some devices may be low power devices with limited battery power and/or available transmit power. A managing device may be the same or different from other devices in the group.

Figure 2:
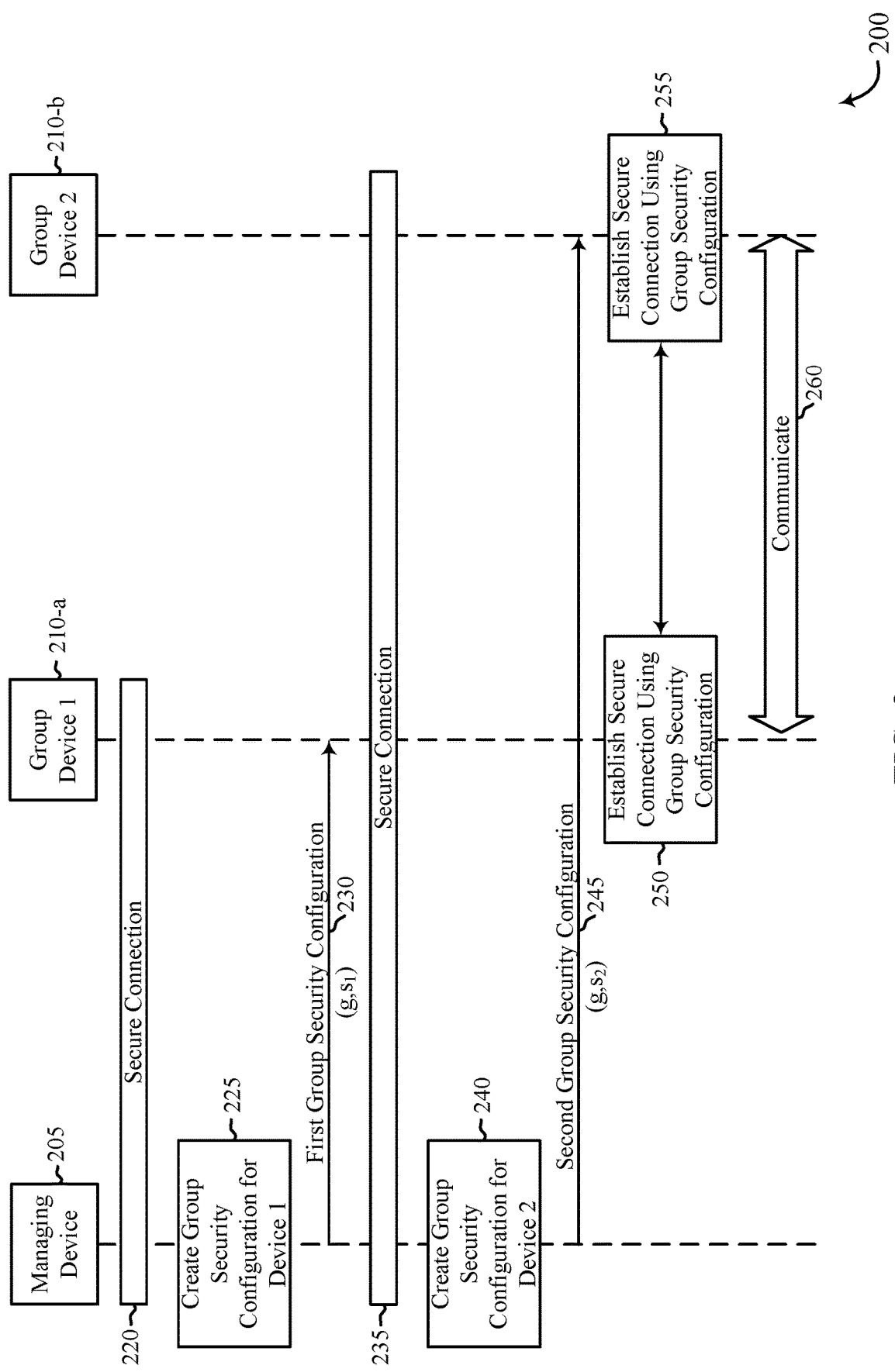
FIG. 2 illustrates an example of a process flow of a system that supports key establishment for communication within a group, in accordance with aspects of the present disclosure.

FIG. 2 illustrates an example of a process flow 200 of a system that supports key establishment for communication within a group, in accordance with aspects of the present disclosure. Process flow 200 may include a managing device 205 (e.g., one of the devices including a group security configuration manager 510 as described with reference to FIG. 1), and group devices 210 (e.g., devices including a group device secure connection manager 710 as described with reference to FIG. 1), such as a first group device 210-a, and a second group device 210-b. The managing device 205, first group device 210-a, and/or second group device 210-b may each be examples of the devices, UEs 115, base stations 105, core network devices 135, APs, etc., described with reference to FIG. 1. The first group device 210-a and the second group device 210-b may be associated with a group of devices that is managed by the managing device 205. For example, the managing device 205 may be used to create the group, add and/or remove member devices from the group, as well as perform the described key establishment for communications between devices of the group.

Aspects of the present disclosure may provide for the managing device 205 to provision a group security configuration to individual group devices 210 within the group of devices. The group devices 210 may then use their respective group security configurations to establish a secure connection or association with each other without relying on the managing device 205 (e.g., directly, without communicating with the managing device 205 during the establishment of the secure connection or association). A secure association between the group devices may be pairwise such that compromising one device may not impact the security between other group devices 210. The managing device 205 may update group security configurations over time (e.g., based on identification of a security compromise, according to an update schedule, etc.). In some examples, updating group security configurations may invalidate previous versions of group security configurations.

At 220, the managing device 205 may have a secure connection with the first group device 210-a. The secure connection may be established using security protocols (e.g., the managing device 205 and first group device 210-a may establish a pairwise key for security, etc.). The managing device 205 and first group device 210-a may establish the secure connection initially, periodically, and/or on an as-needed basis. The secure connection may provide a mechanism for the managing device 205 and the first group device 210-a to communicate (e.g., communicate information, data, etc.) in a secure manner.

At 225, the managing device 205 may create a group security configuration (e.g., a first group security configuration) for the first group device 210-a. As described herein, the managing device 205 may create (e.g., using a group security configuration manager 510) a group security configuration for each device within the group of devices. A group security configuration may include a group security parameter (g) that is associated with (e.g., common to, common across, etc.) the group of devices. A group security configuration may also include a device-specific security parameter ($s_i$) that is associated with a particular device in the group of devices (e.g., the device-specific security parameter for the first group security configuration is associated with or unique to the first group device 210-a). In some aspects, a group security parameter may provide a group secret used by each device in a matrix construction, as discussed in greater detail below. A group security parameter may include, in some examples, a maximum group size indicator associated with a quantity of devices permitted in the group of devices. In some aspects, the device-specific security parameter may include a device-specific secret value and, in some examples, may include an index (or identification) of the associated group device (e.g., the first group device 210-a for the first group security configuration) assigned by the managing device 205.

The group security parameter may include a group naming component indicative of the group of devices (e.g., domain name server (DNS) name, group function, etc.). The group security parameter g may be represented as "group_id=f(group name)," in some examples. The device-specific security parameter may include a numerical value assigned by the managing device 205 and unique to a respective group device (e.g., the first group device 210-a for the first group security configuration).

The managing device 205 may include a configurable security feature associated with a group security level. The configurable security feature may also be referred to as a (λ, n) security feature where n refers to the maximum quantity of devices within the group of devices and λ refers to the group security level which may be a threshold quantity of group devices that must be compromised (e.g., having a change in a device's group connection status) before the group security is considered to be compromised (e.g., such that colluding devices may compromise security between uncompromised devices, including determining a key established between the two uncompromised devices). A device being compromised may include a new device joining the group, a group device leaving the group, a group device having a security compromise, etc. The managing device 205 may determine the value for λ as a fixed numerical value, as a percentage of the n value, and/or the like. In some examples, when the managing device determines that a quantity of group devices having a change in connection status reaches or exceeds the λ value (or some predetermined value less than the λ value), the managing device 205 may update the group security parameter and provide updated group security configurations to the respective group devices. Additionally or alternatively, if the managing device 205 determines that one or more group devices may be compromised, the managing device may also update the group security parameter and provide updated group security configurations to the respective group devices.

In some aspects, the managing device 205 may maintain, in confidence, a matrix "P," which may be a private matrix. The matrix P may be a symmetric λ+1 by λ+1 matrix. The managing device 205 may also maintain a matrix "G" that is generated using the group security parameter g, and may be a public matrix. The matrix G may be shared with, or be otherwise provisioned to the devices in the group. The matrix G may have a dimension of λ+1 by N, where N refers to the maximum quantity of devices permitted within the group of devices. The matrix G may be a Vandermonde matrix, for example. An example of the matrix G may be:

$$G = \begin{pmatrix} 1 & \cdots & 1 \\ g & g^2 & g^N \\ (g)^2 & (g^2)^2 & (g^N)^2 \\ \vdots & \ddots & \vdots \\ (g)^\lambda & \cdots & (g^N)^\lambda \end{pmatrix}.$$

The managing device 205 may also compute and maintain a matrix "S." The matrix S may have a dimension of N by $\lambda+1$, and may be the transpose of the product of the matrix P and the matrix G (e.g., $S=(PG)^T$). Within the matrix S, S(i, :), which may denote the i-th row of the matrix S, may be a device-specific security parameter (e.g., $s_i$ for a group device i), and may be provided to group device i. Thus, the first group security configuration, created for the first group device 210-a, may be $(g, s_1)$.

At 230, the managing device 205 may provide (e.g., transmit) the first group security configuration, including $(g, s_1)$, to the first group device 210-a. This may support resilience against compromise of $\lambda$ devices within the group, where $\lambda$ is determined by the managing device 205 and may depend on such factors as the particular deployment scenario, security requirements, etc.

At 235, the managing device 205 may have a secure connection with the second group device 210-b. The secure connection may be established using security protocols (e.g., the managing device 205 and the second group device 210-b may establish a pairwise key for security). The managing device 205 and second group device 210-b may establish the secure connection initially, periodically, and/or on an as-needed basis. The secure connection may provide a mechanism for the managing device 205 and the second group device 210-b to communicate (e.g., communicate information, data, etc.), in a secure manner.

At 240, the managing device 205 may create a group security configuration (e.g., a second group security configuration) for the second group device 210-b using techniques described with reference to the first group device 210-a at 225. Thus, the second group security configuration, created for the second group device 210-b, may include the group security parameter g and the respective device-specific security parameter (e.g., $s_2$). At 245, the managing device 205 may provide (e.g., transmit) the second group security configuration, including includes $(g, s_2)$, to the second group device 210-b.

At 250 and/or 255, the first group device 210-a and/or the second group device 210-b, respectively, may use their respective group security configuration to establish a secure connection or association (e.g., in cooperation with a group device secure connection manager at the first group device 210-a and/or a group device secure connection manager at the second group device 210-b). The secure connection or association may be established without additional communications with the managing device 205. In some aspects, the information exchanged between the first group device 210-a and the second group device 210-b may include a device ID (e.g., a device index of the respective device in the group) and a group ID. The device ID may be used to generate and/or compute G(:, index) and the group ID may be used to determine the group security parameter g that may then be used to compute G. It is to be understood that a device may belong to multiple groups.

Generally, the first group device 210-a and the second group device 210-b may establish a symmetrical pairwise key to establish the secure connection (e.g., $K_{1,2}=$ SG(1,2)=SG(2,1)=$K_{2,1}$). The first group device 210-a may maintain S(1, :) and use the group security parameter g to compute G(:, 2) (which is the 2nd column of matrix G, and may be computed by the device as needed as described above). Similarly, the second group device 210-b may maintain S(2, :) and may use the group security parameter g to compute G(:, 1). Thus, the pairwise key $K_{1,2}$ for the first group device 210-a may be computed as SG(1,2)= S(1, :)*G(:, 2)=S(2, :)*G(:, 1)=SG(2,1) (e.g., being equal to the pairwise key $K_{2,1}$ computed by second group device 210-b). In some examples, the described pairwise key derivation may be a Blom's scheme.

In some aspects, a group ID or group index for the group security parameter may be used to determine or compute G. When a group device establishes a secure connection, the group device 210 may indicate the group ID or group index for the group security parameter that it is using at a particular time. In the situation where a group device 210 is not using a current group security parameter, the group device 210 may communicate with the managing device 205 to receive the current group security parameter.

The first group device 210-a and the second group device 210-b may establish the secure connection for communications and, at 260, may communicate via the secure connection. Although not shown in FIG. 2, the managing device 205 may also create and provide group security configurations for other group devices 210 within the group of devices. Moreover, the managing device may also provide for updates of group security configurations (e.g., updates for a group security parameter, etc.). The managing device may change or update an identifier or an index of the group security parameter, and may provide the changed or updated information to associated group devices during an update procedure. In some examples, updating the respective group security configurations may be performed over secure unicast channels. In the event of a node revocation (e.g., a group device 210 being removed from a group, etc.), updating group security configuration(s) may include sending updated information to all group devices 210 of a group except the revoked nodes.

Figure 3:
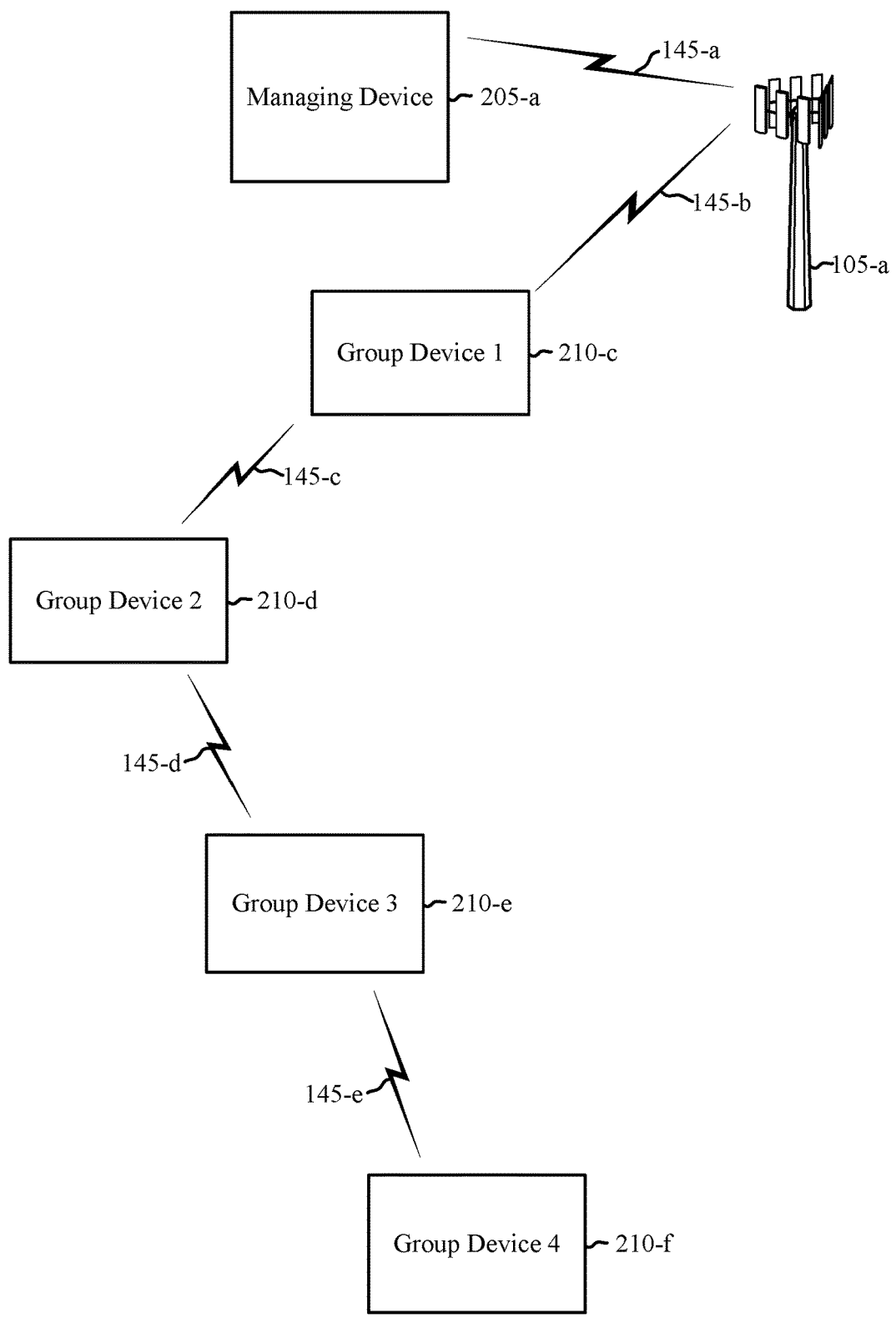
FIG. 3 illustrates an example of a wireless communications system that supports key establishment for communication within a group, in accordance with aspects of the present disclosure.

FIG. 3 illustrates an example of a wireless communications system 300 that supports key establishment for communication within a group, in accordance with aspects of the present disclosure. In some examples, wireless communications system 300 may represent aspects of techniques performed by a UE 115, a base station 105, a core network device 135, a managing device 205, and/or a group device 210 as described with reference to FIGS. 1-2. Wireless communications system 300 illustrates an example of devices associated with a group of devices, and may include a managing device 205-a, a first group device 210-c, a second group device 210-d, a third group device 210-e, and a fourth group device 210-f, which may be examples of the corresponding devices of FIG. 2. The managing device 205-a may communicate with the group devices via base station 105-a, for example, which may or may not be considered to be one of the group devices. In other examples, the managing device 205-a may communicate with the group devices via an AP (not shown). Wireless communications system 300 illustrates an example where the group devices perform multi-hop communications based on group security configurations provided to each group device 210 (e.g., group devices 210-c, 210-d, 210-e, and 210-f) by the managing device 205-a.

Managing device 205-a may create and provide, to the first group device 210-c, the second group device 210-d, the third group device 210-e, and the fourth group device 210-f, respective group security configurations (e.g., a first group security configuration, a second group security configuration, a third group security configuration, and a fourth group security configuration, respectively). The group security configurations may include a group security parameter (e.g., g) that is common within the group and a respective device-specific security parameter (e.g., $s_i$) that is unique to each group device 210. In various examples the respective group security configurations may be provided initially when the group is created, periodically according to a routine group security update, on an as-needed basis based on a security compromise event, and/or the like.

The respective group security configurations may be provided to the group devices 210 over a secure connection, which in various examples may include a direct D2D connection between the managing device 205-a and the respective group device 210, or a multi-hop connection established with end-to-end security between the managing device 205-a and the respective group device 210. For example, the group devices 210 may be stationary and/or located in an arrangement such that the fourth group device 210-f, is unable to communicate directly with the base station 105-a (e.g., to access network services, exchange information, etc.). In some examples, the fourth group device 210-f may have previously received a group security configuration from the managing device 205 (e.g., when the fourth group device 210-f was within a range of the managing device 205, within a range of the base station 105-a, etc.) prior to moving to an out-of-range position. In some examples, the fourth group device 210-f may be initialized in an out-of-range position, and establish a secure connection with base station 105-a through multiple hops. That is, the fourth group device 210-f may initially establish end-to-end security through multiple hops between the fourth group device 210-f and base station 105-a rather than the described P2P security between each hop, and receive a group security configuration from the managing device 205-a via the connection with established end-to-end security. In various examples, the fourth group device 210-f may subsequently use a received group security configuration to establish secure communication links with other group devices 210, which may be established without further communications with the managing device 205-a.

The fourth group device 210-f may determine a topology of the group via broadcast announcements or advertisements transmitted by the other group devices 210 (e.g., the first group device 210-c, the second group device 210-d, and/or the third group device 210-e). Thus, the fourth group device 210-f may determine that the first group device 210-c is in direct communication with base station 105-a, in communication with managing device 205-a, etc. The fourth group device 210-f may broadcast a request for services that may include multi-hop communications. A first hop may be made via D2D connection 145-e between the fourth group device 210-f and the third group device 210-e, a second hop may be made via D2D connection 145-d between the third group device 210-e and the second group device 210-d, a third hop may be made via D2D connection 145-c between the second group device 210-d and the first group device 210-c, and a fourth hop may be made via D2D connection 145-b between the first group device 210-c and the base station 105-a. Thus, the multi-hop communications between the fourth group device 210-f and the base station 105-a may be referred to as four-hop communications.

To perform the multi-hop communications, the fourth group device 210-f and the third group device 210-e may use their respective group security configurations to establish a secure association or connection for communications via the first hop (e.g., via D2D connection 145-e). Similarly, the third group device 210-e and the second group device 210-d may use their respective group security configurations to establish a secure association or connection for communications via the second hop (e.g., via D2D connection 145-d). This may continue for each hop until the communication hops are each secure. Thus, the group devices may use their respective group security configurations to establish secure connections without additional communications with the managing device 205-a during the establishment. The secure connections may be established by computing a pairwise key for each hop, as described with reference to FIG. 2.

Figure 4:
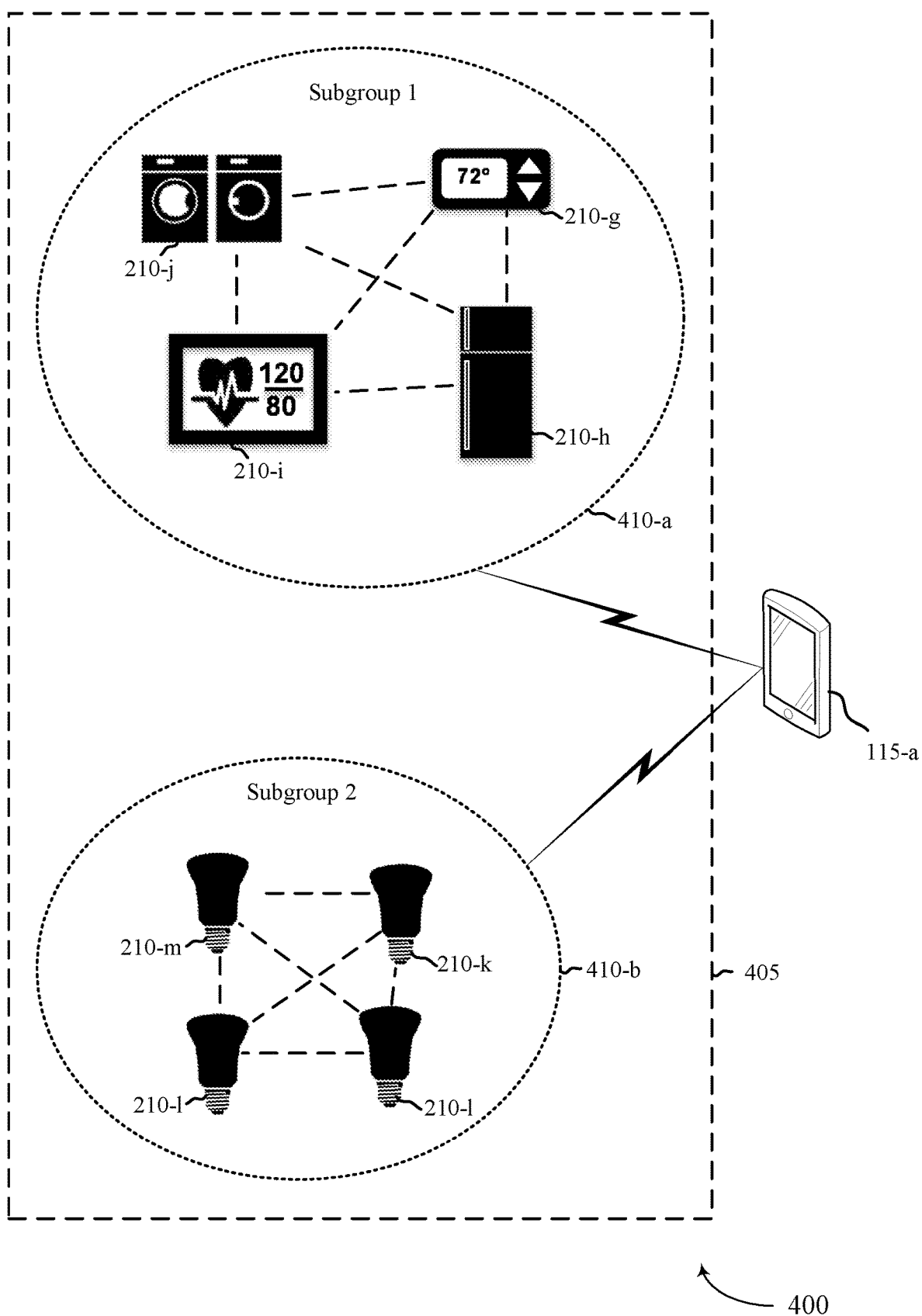
FIG. 4 illustrates an example of a wireless communications system that supports key establishment for communication within a group, in accordance with aspects of the present disclosure.

FIG. 4 illustrates an example of a wireless communications system 400 that supports key establishment for communication within a group 405, in accordance with various aspects of the present disclosure. Wireless communications system 400 may include UE 115-a, which may be examples of the corresponding devices described with reference to FIGS. 1 through 3. UE 115-a may be a managing device (e.g., a managing device 205 that includes a group security configuration manager 510) that manages a group 405 of group devices 210, as described with reference to FIGS. 1 through 3. The wireless communications system 400 illustrates an example where the managing device 205 (e.g., the UE 115-a) manages multiple groups (e.g., subgroups 410) of group devices 210.

A first subgroup 410-a may include group devices 210 (e.g., group devices 210-g, 210-h, 210-i, and 210-j) that have a logical relationship, such as a group of smart appliances (e.g., as shown in wireless communications system 400), a group of a particular type of sensor nodes within a sensor array, and/or the like. A second subgroup 410-b may also include group devices (e.g., group devices 210-k, 210-l, 210-m, and 210-n) that have a logical relationship, such as smart lights within a connected home environment. In some examples, the devices in the first subgroup 410-a and the second subgroup 410-b may each belong to a physical transport network (e.g., a connectivity group such as a home group). The devices within each subgroup 410 may belong to a respective logical network (e.g., home/application1, home/application2, etc.).

In a multi-group instance, the managing device 205 (e.g., UE 115-a) may use a hierarchical naming technique that may indicate the group definition or function. In the example illustrated by wireless communications system 400, an example naming convention may include group/subgroup1/subgroup2. Thus, an example of a group identifier for the group security parameter g may be group_id=f(group name/subgroup name), where the "/" represents a naming hierarchy rather than an "or" function.

The managing device 205 (e.g., UE 115-a) may utilize the group identifier for each subgroup 410 to determine the group security parameter of the respective group security configurations for the subgroup 410 according to the above-described techniques. Thus, each group device 210 within the composite group 405, within the subgroup 410-a, and/or within the subgroup 410-b may maintain a respective group security configuration for the composite group 405 as well as a respective group security configuration for the associated subgroup(s) 410. The group devices 210 may use either group security configuration to establish secure connections to other group devices 210 in accordance with the above-described techniques.

In some examples, group devices 210 may belong to multiple groups 405 or multiple subgroups 410. For example, a smart device may belong to a first logical group 405 managed by a first managing device 205, may belong to a second logical group 405 managed by the first managing device 205 or a different managing device 205, and so on. The group devices 210 may store their respective group security configurations for each associated group 405 and/or subgroup 410 and use their respective group security configurations for pairwise key establishment with other devices in the associated group 405 and/or subgroup(s) 410.

Figure 5:
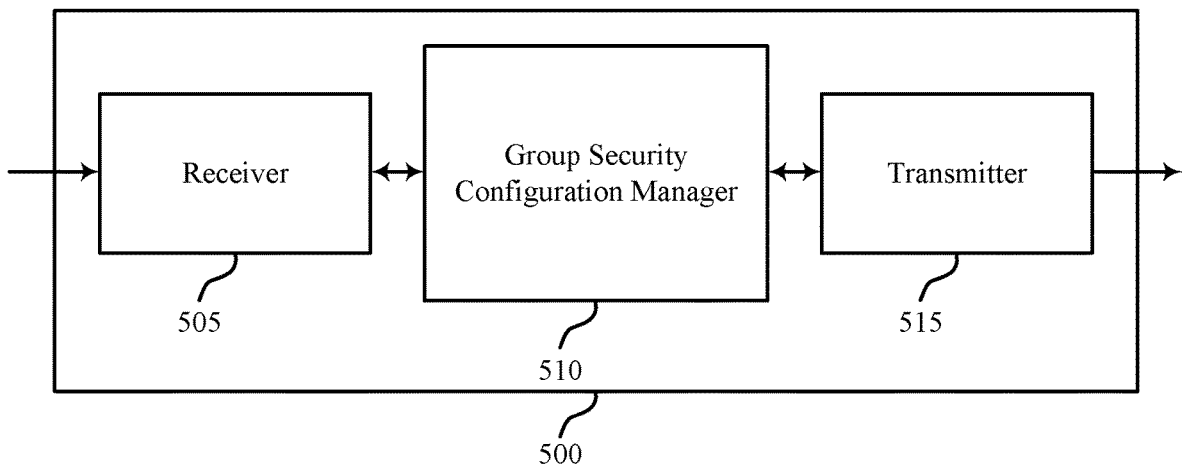
FIG. 5 shows a block diagram of an apparatus that supports key establishment for communication within a group, in accordance with aspects of the present disclosure.

FIG. 5 shows a block diagram of an apparatus 500 that supports key establishment for communication within a group, in accordance with aspects of the present disclosure. Apparatus 500 may be an example of aspects of a managing device 205 as described with reference to FIGS. 1-4, which may be part of a base station 105, a UE 115, or a core network device 135. Apparatus 500 may include a receiver 505, a group security configuration manager 510, and a transmitter 515. Apparatus 500 may also include a processor. Each of these components may be in communication with each other.

The receiver 505 may receive information such as packets, user data, or control information associated with various information channels (e.g., control channels, data channels, and information related to key establishment for communication within a group, etc.). Information may be passed on to other components of the apparatus 500. The receiver 505 may be an example of aspects of the transceiver(s) 925 or 1025 described with reference to FIG. 9 or 10. In various examples the receiver 505 may include a single antenna, or it may include a plurality of antennas.

The group security configuration manager 510 may create group security configurations for devices (e.g., group devices 210) of a group of devices managed by a managing device 205 that comprises the apparatus 500. The group security configurations may include a group security parameter associated with the group of devices and a device-specific security parameter associated with the respective group device 210. The group security configuration manager 510 may provide (e.g., in cooperation with the transmitter 515) group devices 210 of the group of devices with the group security configuration, where the group security configurations are configured to be used to establish a secure connection for communications between group devices 210. In some cases, the one or more devices establish the secure connection for communications without communicating with the managing device. In some cases, the group of devices comprise at least one of a group of sensor nodes, a group of wireless devices forming a wireless P2P network, a group of wireless devices forming a mesh network, a group of devices forming an infrastructure-less network, or combinations thereof. The group security configuration manager 510 may also be an example of aspects of the group security configuration managers 510 described with reference to FIG. 1, 9, or 10.

The transmitter 515 may transmit signals received from other components of apparatus 500. In some examples, the transmitter 515 may be collocated with a receiver in a transceiver module. For example, the transmitter 515 may be an example of aspects of the transceiver(s) 925 or 1025 described with reference to FIG. 9 or 10. In various examples the transmitter 515 may include a single antenna, or it may include a plurality of antennas.

Figure 6:
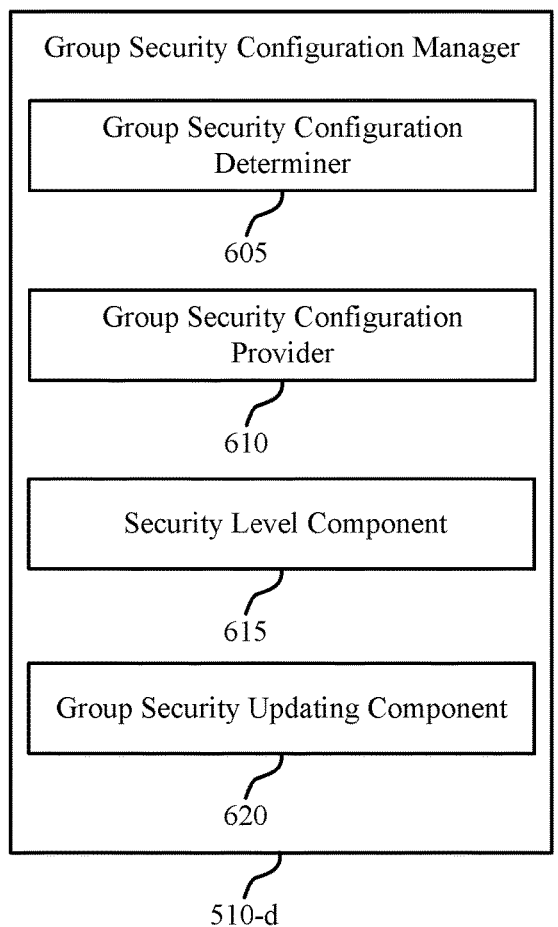
FIG. 6 shows a block diagram of a group security configuration manager that supports key establishment for communications within a group, in accordance with aspects of the present disclosure.

FIG. 6 shows a block diagram of a group security configuration manager 510-d that supports key establishment for communication within a group, in accordance with aspects of the present disclosure. The group security configuration manager 510-d may be an example of aspects of group security configuration managers 510 described with reference to FIG. 1, 5, 9 or 10. The group security configuration manager 510-d may include group security configuration determiner 605, group security configuration provider 610, security level component 615, and group security updating component 620. Each of these modules may communicate, directly or indirectly, with one another (e.g., via one or more buses).

The group security configuration determiner 605 may create group security configurations for devices (e.g., group devices 210) of a group of devices managed by a managing device 205 comprising the group security configuration manager 510-d. The group security configurations may include a group security parameter associated with the group of devices and a device-specific security parameter associated with the respective group device 210. In some cases, the group of devices comprise at least one of a group of sensor nodes, a group of wireless devices forming a wireless P2P network, a group of wireless devices forming a mesh network, a group of devices forming an infrastructure-less network, or combinations thereof.

The group security configuration provider 610 may provide (e.g., in cooperation with a transmitter) one or more devices of the group of devices with a respective group security configuration, where group security configurations are configured to be used to establish a secure connection for communications between group devices. In some cases, group devices may establish the secure connection for communications without communicating with the managing device during the establishment of the secure connection.

The security level component 615 may determine a group security level for a group of devices based at least in part on a maximum quantity of devices in the group of devices.

The group security updating component 620 may change the group security parameter associated with the group of devices, and update group security configuration(s) based on a quantity of devices that change their group connection status reaching a threshold quantity of devices. In some cases, a device changing its group connection status comprises at least one of a device being identified as a compromised device, a periodic security configuration update, a device departing from the group of devices, a device joining the group of devices, or combinations thereof. In various examples the group security updating component 620 may change a group security parameter, or a device-specific parameter associated with one or more of the group devices 210, or a combination thereof. In some examples the group security updating component 620 may select a group identifier providing an index to an updated group security parameter, an updated device-specific security parameter associated with the first device, or an updated device-specific security parameter associated with the second device, or a combination thereof. In some examples the group security configuration provider 610 may provide (e.g., in cooperation with a transmitter) the updated group security configuration to devices in a group of devices using secure unicast channels, which may include a selected group identifier. In some examples the group security updating component 620 may update and provide (e.g., in cooperation with the group security configuration provider 610) group security configurations to all group devices 210 of a group except those group devices 210 that are removed from the group (e.g., revoked nodes).

Figure 7:
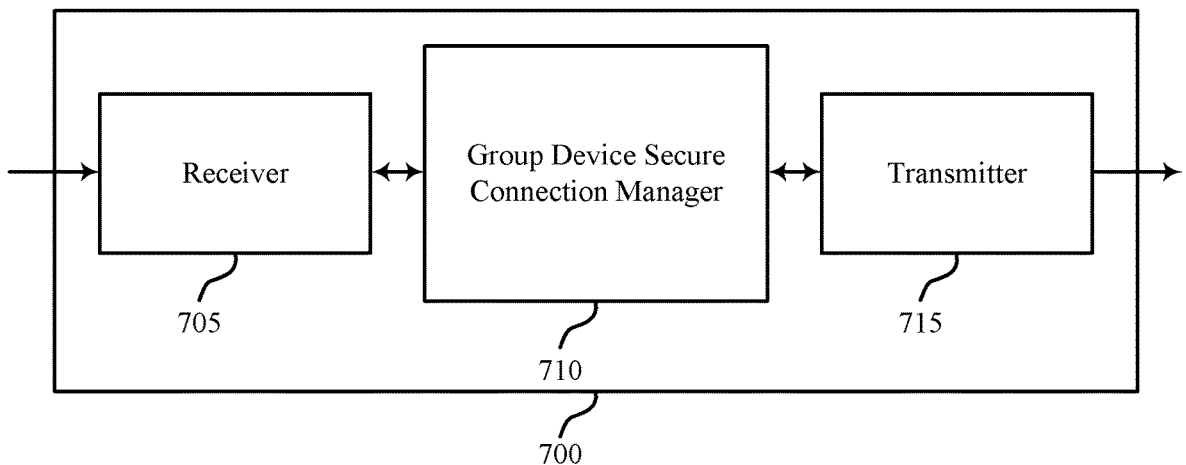
FIG. 7 shows a block diagram of an apparatus that supports key establishment for communication within a group, in accordance with aspects of the present disclosure.

FIG. 7 shows a block diagram of an apparatus 700 that supports key establishment for communication within a group, in accordance with various aspects of the present disclosure. Apparatus 700 may be an example of aspects of a group device 210 as described with reference to FIGS. 1-4, which may be part of a base station 105 or a UE 115. Apparatus 700 may include a receiver 705, a group device secure connection manager 710, and a transmitter 715. Apparatus 700 may also include a processor. Each of these components may be in communication with each other.

The receiver 705 may receive information such as packets, user data, or control information associated with various information channels (e.g., control channels, data channels, and information related to key establishment for communication within a group, etc.). Information may be passed on to other components of the apparatus 700. The receiver 705 may be an example of aspects of the transceiver(s) 925 or 1025 described with reference to FIG. 9 or 10. In various examples the receiver 705 may include a single antenna, or it may include a plurality of antennas.

The group device secure connection manager 710 may receive (e.g., in cooperation with the receiver 705), a first group security configuration from a managing device, the first group security configuration comprising a group security parameter associated with a group of devices (e.g., a group of devices comprising the group device associated with the apparatus 700) and a device-specific security parameter associated with the group device comprising the apparatus 700. The group device secure connection manager 710 may subsequently establish (e.g., in cooperation with the receiver 705 and/or the transmitter 715) a secure connection for communications with a second device of the group of devices based at least in part on the first group security configuration and a second group security configuration provided to the second device, the second group security configuration comprising the group security parameter and a device-specific parameter associated with the second device. In some examples the secure connection may be established without additional communications with the managing device during the establishment of the secure connection.

The transmitter 715 may transmit signals received from other components of apparatus 700. In some examples, the transmitter 715 may be collocated with a receiver in a transceiver module. For example, the transmitter 715 may be an example of aspects of the transceiver(s) 925 or 1025 described with reference to FIG. 9 or 10. In various examples the transmitter 715 may include a single antenna, or it may include a plurality of antennas.

Figure 8:
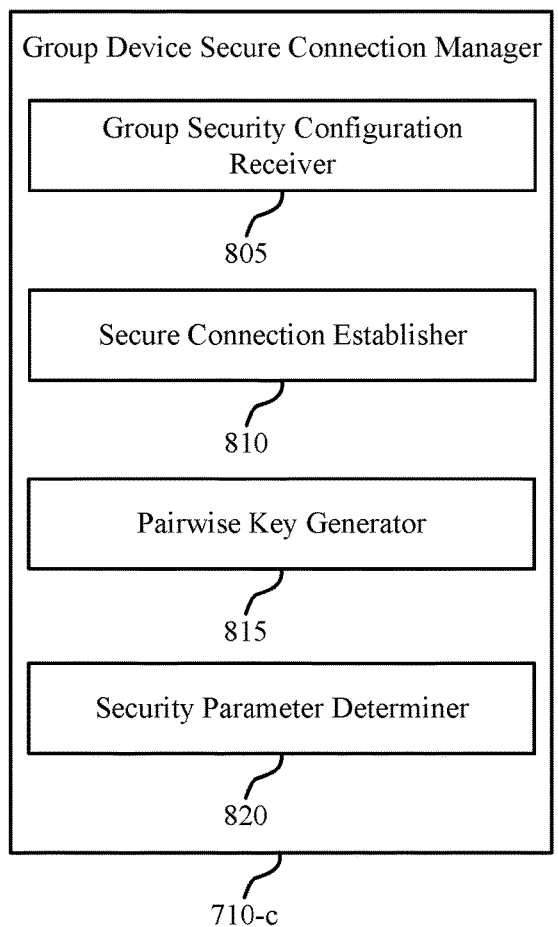
FIG. 8 shows a block diagram of a group device secure connection manager that supports key establishment for communications within a group, in accordance with aspects of the present disclosure.

FIG. 8 shows a block diagram of a group device secure connection manager 710-c that supports key establishment for communication within a group, in accordance with aspects of the present disclosure. The group device secure connection manager 710-c may be an example of aspects of group device secure connection managers 710 described with reference to FIG. 1, 7, 9, or 10. The group device secure connection manager 710-c may include a group security configuration receiver 805, a secure connection establisher 810, a pairwise key generator 815, and a security parameter determiner 820. Each of these modules may communicate, directly or indirectly, with one another (e.g., via one or more buses).

The group security configuration receiver 805 may receive (e.g., in cooperation with a receiver), a first group security configuration from a managing device, the first group security configuration comprising a group security parameter associated with a group of devices (e.g., a group of devices comprising the group device associated with the group device secure connection manager 710-c) and a device-specific security parameter associated with the group device comprising the group device secure connection manager 710-c.

The secure connection establisher 810 may establish a secure connection for communications with a second device of the group of devices based at least in part on the first group security configuration and a second group security configuration provided to the second device, the second group security configuration comprising the group security parameter and a device-specific parameter associated with the second device. In some examples the secure connection may be established without additional communications with the managing device during the establishment of the secure connection.

The pairwise key generator 815 may generate, based at least in part on the first group security configuration and the second group security configuration, a pairwise key to establish the secure connection, the pairwise key being symmetric between the first device and the second device.

The security parameter determiner 820 may determine the device-specific security parameter associated with the second device, and the secure connection established by the secure connection establisher 810 may be based at least in part on the device-specific security parameter associated with the second device as determined at the security parameter determiner 820. In some examples the security parameter determiner 820 may determine the device-specific security parameter associated with the second device by receiving, from the second device, a broadcast message that includes the device-specific security parameter associated with the second device.

Figure 9:
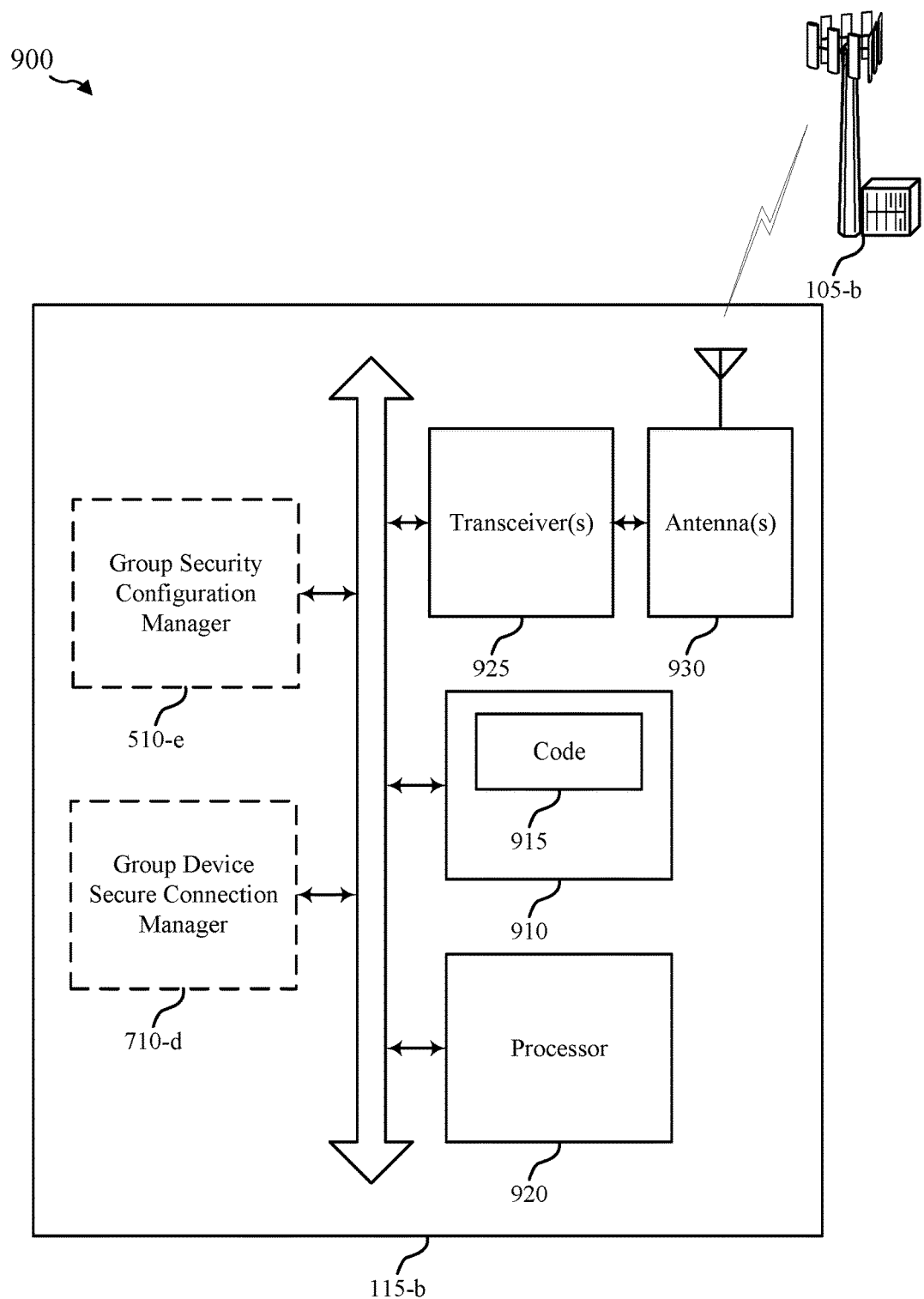
FIG. 9 shows a diagram of a system including a UE that supports key establishment for communication within a group, in accordance with aspects of the present disclosure.

FIG. 9 shows a diagram of a system 900 including a UE 115-b that supports key establishment for communication within a group, in accordance with aspects of the present disclosure. The UE 115-b may be an example of the UEs 115 described with reference to FIG. 1 or 4. In various examples the UE 115-b may be an example of one or both of a managing device 205 or a group device 210, as described with reference to FIGS. 1-4, and may include aspects of an apparatus 500 described with reference to FIG. 5 and/or an apparatus 700 described with reference to FIG. 6.

In some examples the UE 115-b may include a group security configuration manager 510-e, which may be an example of aspects of the group security configuration managers 510 described with reference to FIG. 1, 5, or 6. In such examples the UE 115-b may be configured to operate as a managing device (e.g., a managing device 205) as described herein. Additionally or alternatively, the UE 115-b may include a group device secure connection manager 710-d, which may be an example of aspects of the group device secure connection managers 710 described with reference to FIG. 1, 7, or 8. In such examples the UE 115-b may, additionally or alternatively, be configured to operate as a managing device (e.g., a managing device 205) as described herein. The UE 115-b may also include memory 910, processor 920, transceiver(s) 925, and antenna(s) 930. Each of these modules may communicate, directly or indirectly, with one another (e.g., via one or more buses).

The memory 910 may include random access memory (RAM) and read only memory (ROM). The memory 910 may store computer-readable, computer-executable software/firmware code 915 including instructions that, when executed, cause the processor 920 to perform various functions described herein (e.g., key establishment for communication within a group, etc.). In some cases, the code 915 may not be directly executable by the processor 920 but may cause a computer (e.g., when compiled and executed) to perform functions described herein.

The processor 920 may include an intelligent hardware device, (e.g., a central processing unit (CPU), a microcontroller, an application specific integrated circuit (ASIC), etc.)

The transceiver(s) 925 may communicate bi-directionally, via one or more antennas, wired, or wireless links, with one or more networks, as described above. For example, the transceiver(s) 925 may communicate bi-directionally with a base station 105-b or another UE 115. The transceiver(s) 925 may also include a modem to modulate the packets and provide the modulated packets to the antenna(s) 930 for transmission, and to demodulate packets received from the antenna(s) 930.

In some cases, the UE 115-b may include a single antenna 930. However, in some cases the UE 115-b may have more than one antenna 930, which may be capable of concurrently transmitting or receiving multiple wireless transmissions.

Figure 10:
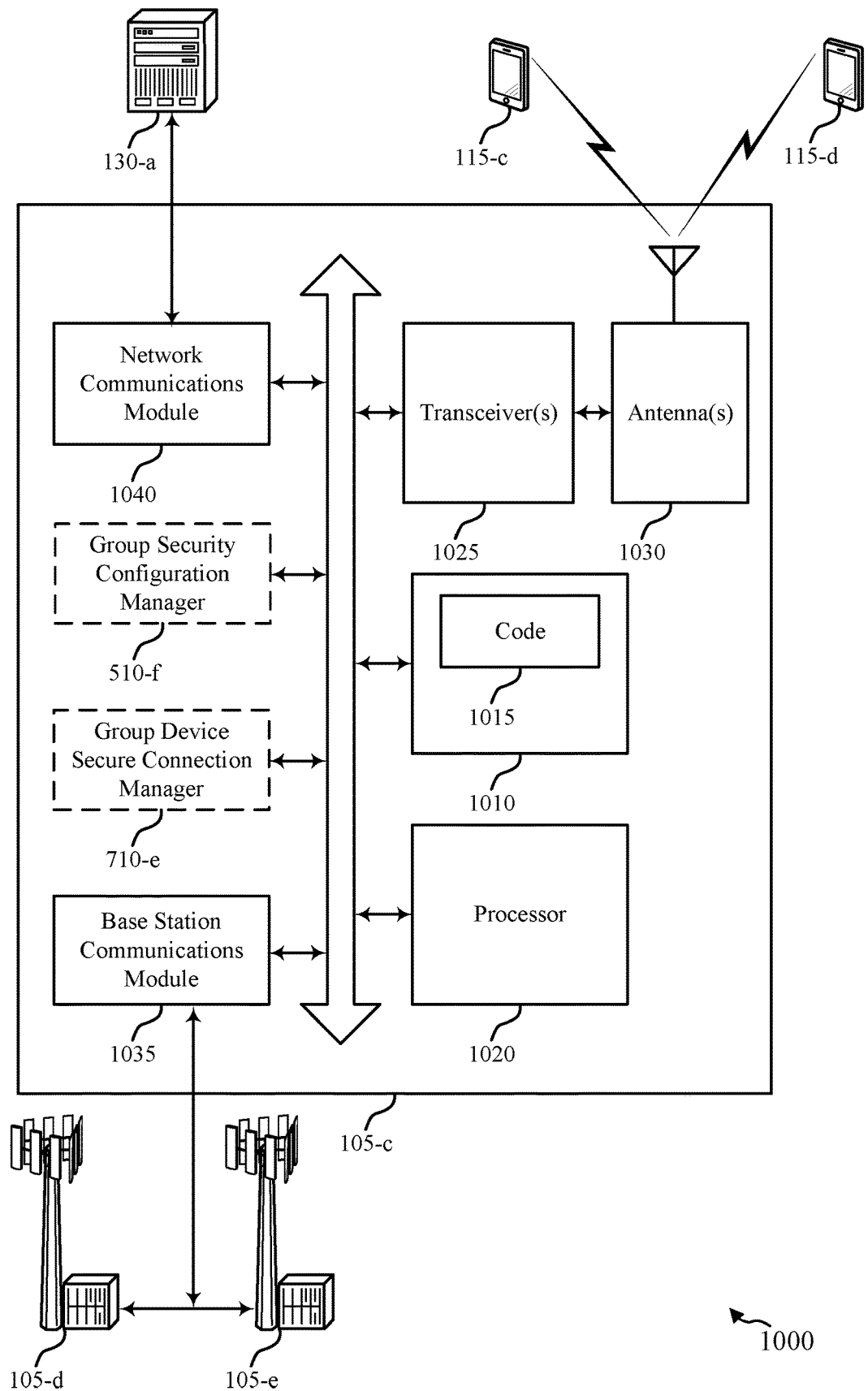
FIG. 10 shows a diagram of a system including a base station that supports key establishment for communication within a group, in accordance with aspects of the present disclosure

FIG. 10 shows a diagram of a system 1000 including a base station 105-c that supports key establishment for communication within a group, in accordance with aspects of the present disclosure. Base station 105-c may be an example of base stations 105 as described with reference to FIG. 1, 3, or 9. In various examples the base station 105-c may be an example of one or both of a managing device 205 or a group device 210, as described with reference to FIGS. 1-4, and may include aspects of an apparatus 500 described with reference to FIG. 5 and/or an apparatus 700 described with reference to FIG. 6. base station 105-g may also include components for bi-directional voice and data communications including components for transmitting communications and components for receiving communications. For example, base station 105-c may communicate bi-directionally with one or more UEs 115, such as UE 115-c and UE 115-d.

In some examples the base station 105-c may include a group security configuration manager 510-e, which may be an example of aspects of the group security configuration managers 510 described with reference to FIG. 1, 5, or 6. In such examples the base station 105-c may be configured to operate as a managing device (e.g., a managing device 205) as described herein. Additionally or alternatively, the base station 105-c may include a group device secure connection manager 710-c, which may be an example of aspects of the group device secure connection managers 710 described with reference to FIG. 1, 7, or 8. In such examples the base station 105-c may, additionally or alternatively, be configured to operate as a group device (e.g., a group device 210) as described herein. The base station 105-c may also include memory 1010, processor 1020, transceiver(s) 1025, antenna(s) 1030, base station communications module 1035 and network communications module 1040. Each of these modules may communicate, directly or indirectly, with one another (e.g., via one or more buses).

The memory 1010 may include RAM and ROM. The memory 1010 may store computer-readable, computer-executable software/firmware code 1015 including instructions that, when executed, cause the processor to perform various functions described herein (e.g., macro and micro DRX, etc.). In some cases, the code 1015 may not be directly executable by the processor but may cause a computer (e.g., when compiled and executed) to perform functions described herein. The processor 1020 may include an intelligent hardware device, (e.g., a CPU, a microcontroller, an ASIC, etc.)

The transceiver(s) 1025 may communicate bi-directionally, via one or more antennas, wired, or wireless links, with one or more networks, as described above. For example, the transceiver(s) 1025 may communicate bi-directionally with a network device 105 or a UE 115. The transceiver(s) 1025 may also include a modem to modulate the packets and provide the modulated packets to the antennas for transmission, and to demodulate packets received from the antennas. In some cases, the wireless device may include a single antenna 1030. In some cases the device may have more than one antenna 1030, which may be capable of concurrently transmitting or receiving multiple wireless transmissions.

The base station communications module 1035 may manage communications with other base stations 105 (e.g., base stations 105-d and 105-e), and may include a controller or scheduler for controlling communications with UEs 115 in cooperation with other base stations 105. For example, the base station communications module 1035 may coordinate scheduling for transmissions to UEs 115 for various interference mitigation techniques such as beamforming or joint transmission. In some examples, base station communications module 1035 may provide an X2 interface within an LTE/LTE-A wireless communication network technology to provide communication between base stations 105.

The network communications module 1040 may manage communications with the core network (e.g., core network 130-a) via one or more wired backhaul links. For example, the network communications module 1040 may manage the transfer of data communications for client devices, such as one or more UEs 115.

Figure 11:
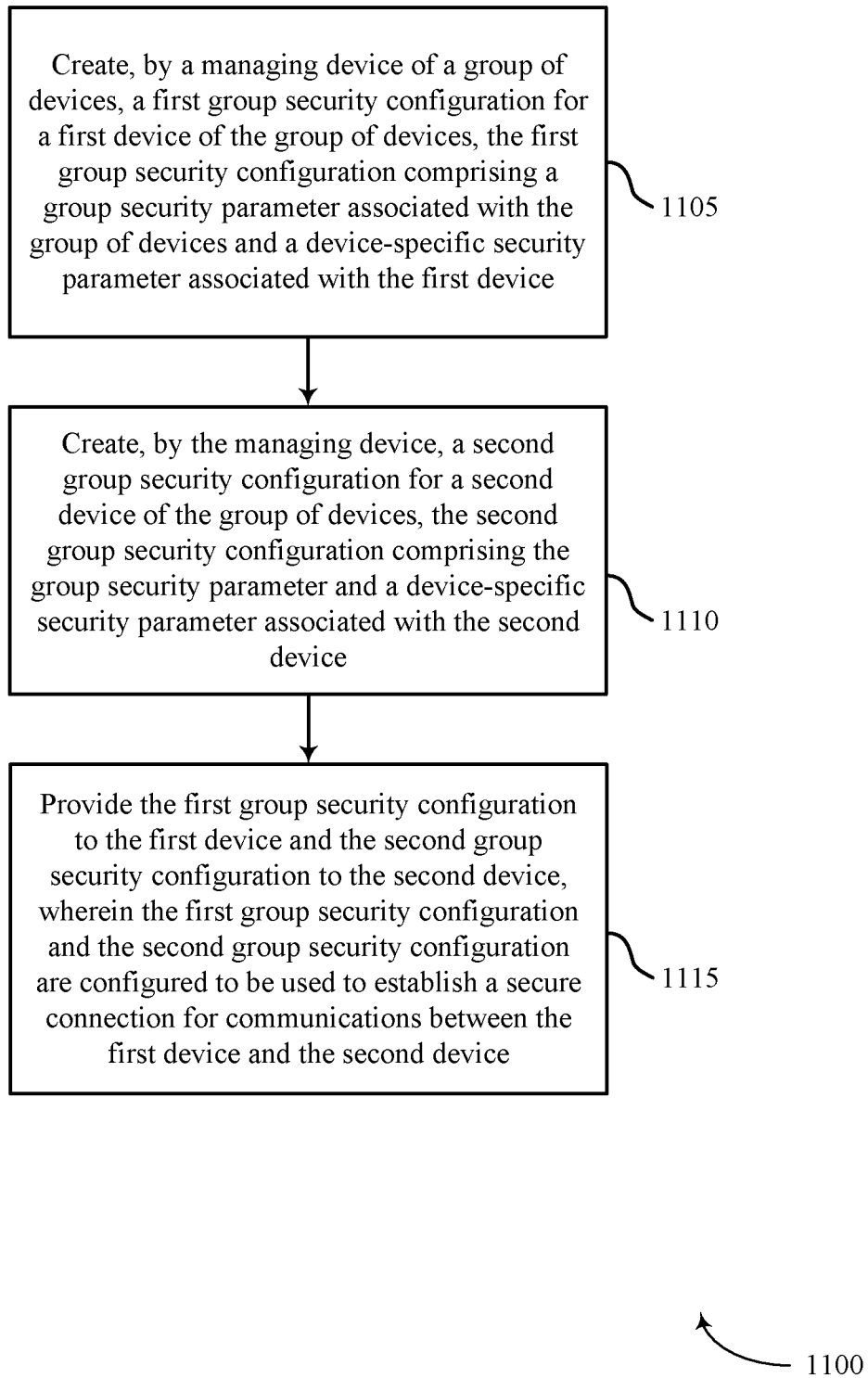
FIGS. 11 through 14 illustrate methods for key establishment for communication within a group, in accordance with aspects of the present disclosure.

FIG. 11 shows a flowchart illustrating a method 1100 for key establishment for communication within a group, in accordance with various aspects of the present disclosure. The operations of method 1100 may be implemented by a managing device 205 of a group of devices as described with reference to FIGS. 1-4, which may include a UE 115, a base station 105, a core network device 135, an apparatus 500, or their respective components as described with reference to FIG. 1-5, 9, or 10. For example, the operations of method 1100 may be performed by a group security configuration manager 510 as described herein. In some examples, the managing device 205 may execute a set of codes to control the functional elements of the managing device 205 to perform the functions described below. Additionally or alternatively, the managing device 205 may perform aspects the functions described below using special-purpose hardware.

At block 1105, the managing device may create a first group security configuration for a first device of the group of devices, the first group security configuration comprising a group security parameter associated with the group of devices and a device-specific security parameter associated with the first device, as described above with reference to FIGS. 1 through 4. In some examples, operations of block 1105 may be performed by a group security configuration manager 510 as described with reference to FIG. 1, 5, 6, 9, or 10, or a group security configuration determiner 605 as described with reference to FIG. 6.

At block 1110, the managing device may create a second group security configuration for a second device of the group of devices, the second group security configuration comprising the group security parameter and a device-specific security parameter associated with the second device, as described above with reference to FIGS. 1 through 4. In some examples, operations of block 1105 may be performed by a group security configuration manager 510 as described with reference to FIG. 1, 5, 6, 9, or 10, or a group security configuration determiner 605 as described with reference to FIG. 6.

At block 1115, the managing device may provide the first group security configuration to the first device and the second group security configuration to the second device, wherein the first group security configuration and the second group security configuration are configured to be used to establish a secure connection for communications between the first device and the second device, as described above with reference to FIGS. 1 through 4. In some examples, the operations of block 1115 may be performed by a group security configuration manager 510 as described with reference to FIG. 1, 5, 6, 9, or 10, or a group security configuration provider 610 as described with reference to FIG. 6, which may operate in cooperation with a transmitter, such as transmitter 515 described with reference to FIG. 5, or transceiver(s) 925 or 1025 described with reference to FIG. 9 or 10.

Figure 12:
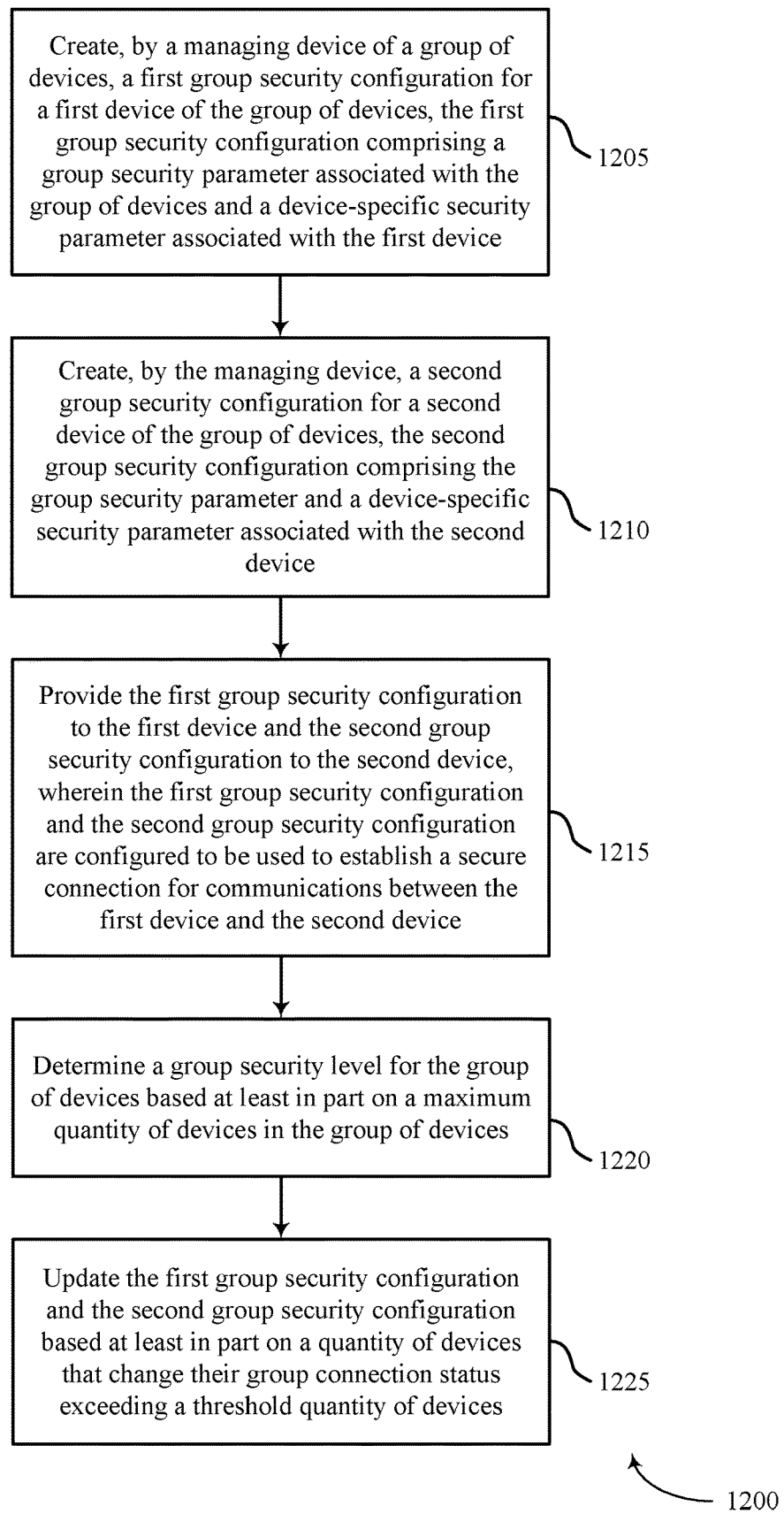

FIG. 12 shows a flowchart illustrating a method 1200 for key establishment for communication within a group, in accordance with various aspects of the present disclosure. The operations of method 1200 may be implemented by a managing device 205 of a group of devices as described with reference to FIGS. 1-4, which may include a UE 115, a base station 105, a core network device 135, an apparatus 500, or their respective components as described with reference to FIG. 1-5, 9, or 10. For example, the operations of method 1200 may be performed by a group security configuration manager 510 as described herein. In some examples, the managing device 205 may execute a set of codes to control the functional elements of the managing device 205 to perform the functions described below. Additionally or alternatively, the managing device 205 may perform aspects the functions described below using special-purpose hardware.

At block 1205, the managing device may create a first group security configuration for a first device of the group of devices, the first group security configuration comprising a group security parameter associated with the group of devices and a device-specific security parameter associated with the first device, as described above with reference to FIGS. 1 through 4. In some examples, operations of block 1205 may be performed by a group security configuration manager 510 as described with reference to FIG. 1, 5, 6, 9, or 10, or a group security configuration determiner 605 as described with reference to FIG. 6.

At block 1210, the managing device may create a second group security configuration for a second device of the group of devices, the second group security configuration comprising the group security parameter and a device-specific security parameter associated with the second device, as described above with reference to FIGS. 1 through 4. In some examples, operations of block 1205 may be performed by a group security configuration manager 510 as described with reference to FIG. 1, 5, 6, 9, or 10, or a group security configuration determiner 605 as described with reference to FIG. 6.

At block 1215, the managing device may provide the first group security configuration to the first device and the second group security configuration to the second device, wherein the first group security configuration and the second group security configuration are configured to be used to establish a secure connection for communications between the first device and the second device, as described above with reference to FIGS. 1 through 4. In some examples, the operations of block 1115 may be performed by a group security configuration manager 510 as described with reference to FIG. 1, 5, 6, 9, or 10, or a group security configuration provider 610 as described with reference to FIG. 6, which may operate in cooperation with a transmitter, such as transmitter 515 described with reference to FIG. 5, or transceiver(s) 925 or 1025 described with reference to FIG. 9 or 10.

At block 1220, the managing device may determine a group security level (e.g., a λ value) for the group of devices based at least in part on a maximum quantity of devices in the group of devices, as described above with reference to FIGS. 1 through 4. In some examples, the operations of block 1115 may be performed by a group security configuration manager 510 as described with reference to FIG. 1, 5, 6, 9, or 10, or a security level component 615 as described with reference to FIG. 6.

At block 1225, the managing device may update the first group security configuration and the second group security configuration based at least in part on a quantity of devices that change their group connection status exceeding a threshold quantity of devices, as described above with reference to FIGS. 1 through 4. In some examples, the operations of block 1115 may be performed by a group security configuration manager 510 as described with reference to FIG. 1, 5, 6, 9, or 10, or a group security updating component 620 as described with reference to FIG. 6.

Figure 13:
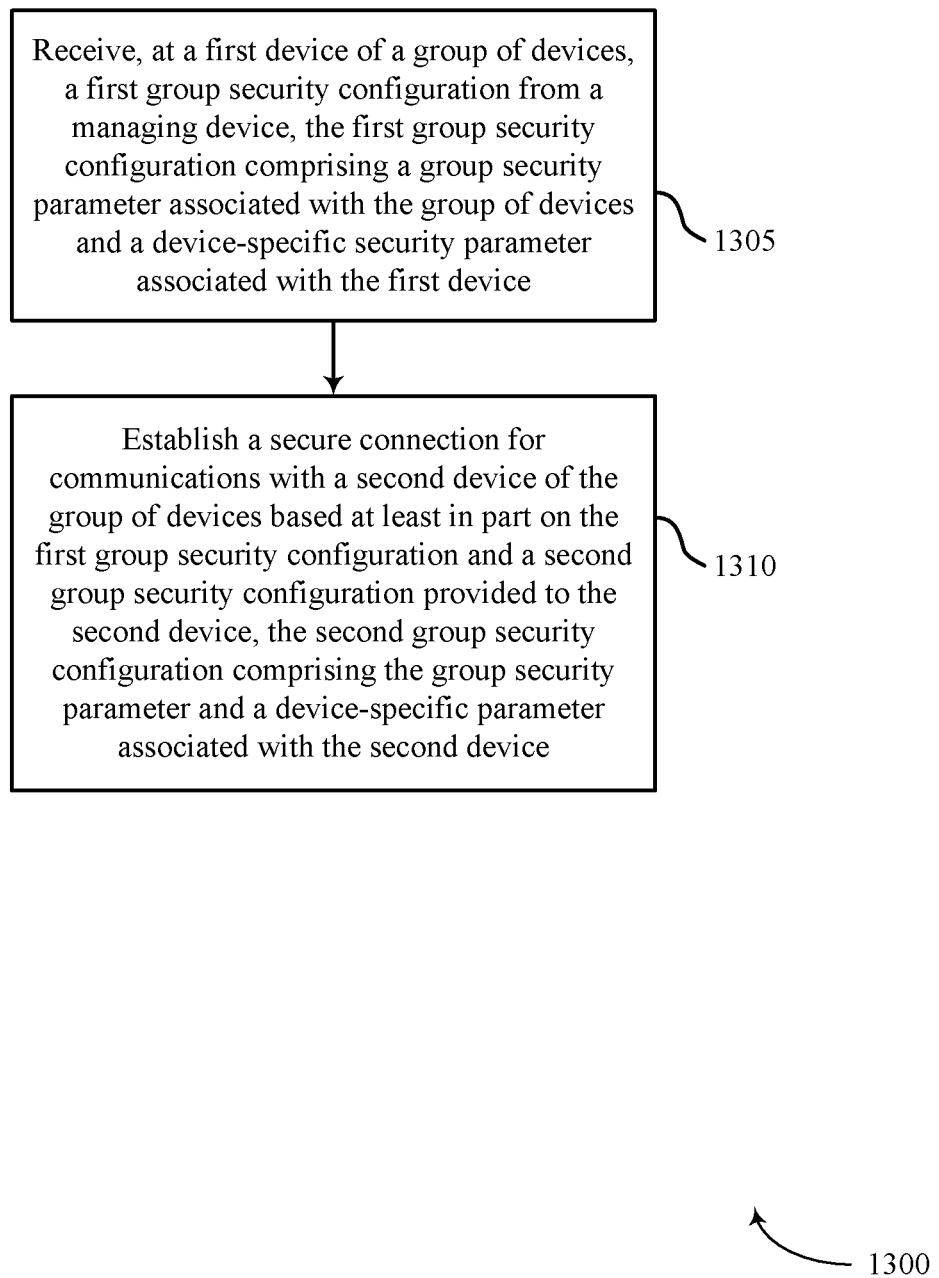

FIG. 13 shows a flowchart illustrating a method 1300 for key establishment for communication within a group, in accordance with various aspects of the present disclosure. The operations of method 1300 may be implemented by a group device 210 of a group of devices as described with reference to FIGS. 1-4, which may include a UE 115, a base station 105, an apparatus 700, or their respective components as described with reference to FIG. 1-4, 7, 9, or 10. For example, the operations of method 1300 may be performed by a group device secure connection manager 710 as described herein. In some examples, the group device 210 may execute a set of codes to control the functional elements of the group device 210 to perform the functions described below. Additionally or alternatively, the group device 210 may perform aspects the functions described below using special-purpose hardware.

At block 1305, the group device may receive, from a managing device, a first group security configuration comprising a group security parameter associated with a group of devices and a device-specific security parameter associated with the device receiving the group security configuration, as described above with reference to FIGS. 1 through 4. In some examples, the operations of block 1305 may be performed by a group device secure connection manager 710 as described with reference to FIG. 1, 7, 8, 9, or 10, or a group security configuration receiver 805 as described with reference to FIG. 8, which may operate in cooperation with a receiver, such as receiver 705 described with reference to FIG. 7, or transceiver(s) 925 or 1025 described with reference to FIG. 9 or 10.

At block 1310, the group device may establish a secure connection for communications with a second device of the group of devices based at least in part on the first group security configuration and a second group security configuration provided to the second device, the second group security configuration comprising the group security parameter and a device-specific parameter associated with the second device, as described above with reference to FIGS. 1 through 4. In some examples, the operations of block 1310 may be performed by a group device secure connection manager 710 as described with reference to FIG. 1, 7, 8, 9, or 10, or a secure connection establisher 810 as described with reference to FIG. 8, which may operate in cooperation with a transmitter and/or a receiver, such as a transmitter 715 or a receiver 705 described with reference to FIG. 7, or transceiver(s) 925 or 1025 described with reference to FIG. 9 or 10.

Figure 14:
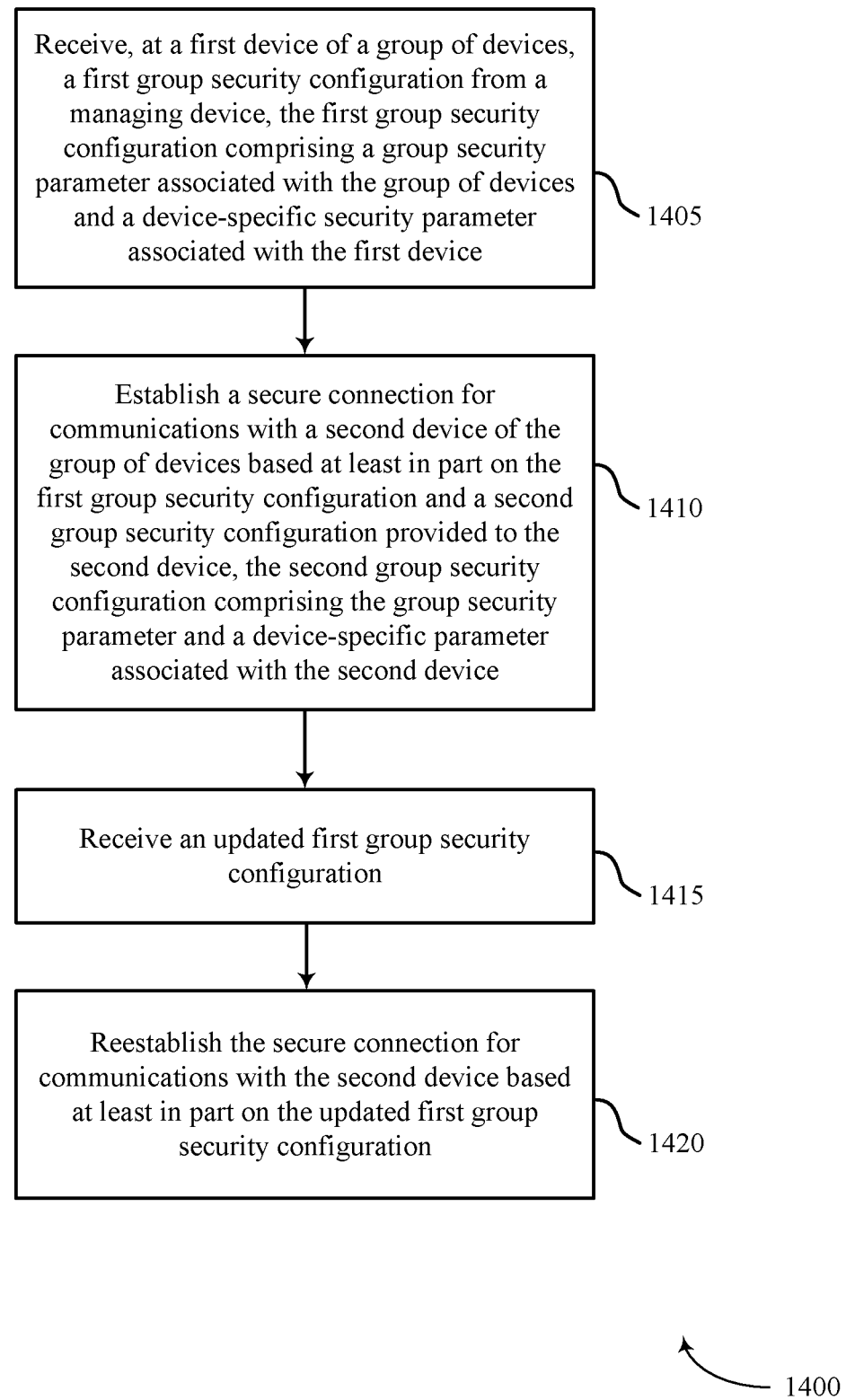

FIG. 14 shows a flowchart illustrating a method 1400 for key establishment for communication within a group, in accordance with various aspects of the present disclosure. The operations of method 1400 may be implemented by a group device 210 of a group of devices as described with reference to FIGS. 1-4, which may include a UE 115, a base station 105, an apparatus 700, or their respective components as described with reference to FIG. 1-4, 7, 9, or 10. For example, the operations of method 1400 may be performed by a group device secure connection manager 710 as described herein. In some examples, the group device 210 may execute a set of codes to control the functional elements of the group device 210 to perform the functions described below. Additionally or alternatively, the group device 210 may perform aspects the functions described below using special-purpose hardware.

At block 1405, the group device may receive, from a managing device, a first group security configuration comprising a group security parameter associated with a group of devices and a device-specific security parameter associated with the device receiving the group security configuration, as described above with reference to FIGS. 1 through 4. In some examples, the operations of block 1405 may be performed by a group device secure connection manager 710 as described with reference to FIG. 1, 7, 8, 9, or 10, or a group security configuration receiver 805 as described with reference to FIG. 8, which may operate in cooperation with a receiver, such as receiver 705 described with reference to FIG. 7, or transceiver(s) 925 or 1025 described with reference to FIG. 9 or 10.

At block 1410, the group device may establish a secure connection for communications with a second device of the group of devices based at least in part on the first group security configuration and a second group security configuration provided to the second device, the second group security configuration comprising the group security parameter and a device-specific parameter associated with the second device, as described above with reference to FIGS. 1 through 4. In some examples, the operations of block 1405 may be performed by a group device secure connection manager 710 as described with reference to FIG. 1, 7, 8, 9, or 10, or a secure connection establisher 810 as described with reference to FIG. 8, which may operate in cooperation with a transmitter and/or a receiver, such as a transmitter 715 or a receiver 705 described with reference to FIG. 7, or transceiver(s) 925 or 1025 described with reference to FIG. 9 or 10.

At block 1415, the group device may receive an updated first group security configuration, as described above with reference to FIGS. 1 through 4. In some examples, the operations of block 1405 may be performed by a group device secure connection manager 710 as described with reference to FIG. 1, 7, 8, 9, or 10, or a group security configuration receiver 805 as described with reference to FIG. 8, which may operate in cooperation with a receiver, such as a receiver 705 described with reference to FIG. 7, or transceiver(s) 925 or 1025 described with reference to FIG. 9 or 10.

At block 1420, the group device may reestablish the secure connection for communications with the second device based at least in part on the updated first group security configuration, as described above with reference to FIGS. 1 through 4. In some examples, the operations of block 1405 may be performed by a group device secure connection manager 710 as described with reference to FIG. 1, 7, 8, 9, or 10, or a secure connection establisher 810 as described with reference to FIG. 8, which may operate in cooperation with a transmitter and/or a receiver, such as a transmitter 715 or a receiver 705 described with reference to FIG. 7, or transceiver(s) 925 or 1025 described with reference to FIG. 9 or 10.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for key establishment for communication within a group.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), Institute of Electrical and Electronics Engineers (IEEE) 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 300 of FIGS. 1 and 3 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for key establishment for communication within a group. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for wireless communication comprising:
   creating, by a managing device of a group of devices, a first group security configuration for a first device of the group of devices, the first group security configuration comprising a group security parameter associated with the group of devices and a device-specific security parameter associated with the first device, wherein a combination of the device specific security parameter associated with the first device and the group security parameter is configured for pairwise key generation for secure connection establishment with the first device;
   creating, by the managing device, a second group security configuration for a second device of the group of devices, the second group security configuration comprising the group security parameter and a device-specific security parameter associated with the second device, wherein a combination of the device-specific security parameter associated with the second device and the group security parameter is configured for pairwise key generation for secure connection establishment with the second device; and
   providing the first group security configuration to the first device and the second group security configuration to the second device, wherein the first group security configuration and the second group security configuration are configured to be used to establish a secure connection for communications between the first device and the second device.

2. The method of claim 1 wherein the first group security configuration and the second group security configuration are configured to be used to establish the secure connection without additional communications with the managing device during the establishment of the secure connection.

3. The method of claim 1, further comprising:
   determining a group security level for the group of devices based at least in part on a maximum number of devices in the group of devices.

4. The method of claim 1, further comprising:
   updating the first group security configuration and the second group security configuration based at least in part on a quantity of devices that change their group connection status exceeding a threshold quantity of devices.

5. The method of claim 4, further comprising:
   providing the updated first group security configuration to, the first device using a first secure unicast channel; and
   providing the updated second group security configuration to the second device using .a second secure unicast channel.

6. The method of claim 4, wherein the updating comprises:
   changing the group security parameter, the device-specific security parameter associated with the first device, or the device-specific security parameter associated with the second device, or a combination thereof.

7. The method of claim 4, wherein the updating comprises:
   selecting a group identifier providing an index to an updated group security parameter, an updated device-specific security parameter associated with the first device, or an updated device-specific security parameter associated with the second device, or a combination thereof; and
   providing the selected group identifier to the first device, or the second device, or both the first device and the second device.

8. The method of claim 4, wherein a device changing its group connection status comprises the device being identified as a compromised device, a periodic security configuration update, the device departing from the group of devices, or the device joining the group of devices, or a combination thereof.

9. The method of claim 1, wherein the group of devices comprise a group of sensor nodes, a group of wireless devices forming a wireless peer-to-peer (P2P) network, a group of wireless devices forming a mesh network, or a group of devices forming an infrastructure-less network, or a combination thereof.

10. A method of wireless communication comprising:
    receiving, at a first device of a group of devices, a first group security configuration from a managing device, the first group security configuration comprising a group security parameter associated with the group of devices and a device-specific security parameter associated with the first device, wherein a combination of the device-specific security parameter associated with the first device and the group security parameter is configured for pairwise key generation for secure connection establishment with the first device; and establishing a secure connection for communications with a second device of the group of devices based at least in part on the first group security configuration and a second group security configuration provided to the second device, the second group security configuration comprising the group security parameter and a device-specific security parameter associated with the second device;

determining, at the first device, the device-specific security parameter associated with the second device, wherein establishing the secure connection is based at least in part on a combination of the device-specific security parameter associated with the first device, the group security parameter, and the device-specific security parameter associated with the second device as determined at the first device.

11. The method of claim 10, wherein the secure connection is established without additional communications with the managing device during the establishment of the secure connection.

12. The method of claim 10, further comprising: generating a pairwise key based at least in part on the combination of the group security parameter and the device-specific security parameter associated with the first device, wherein establishing the secure connection is based at least in part on determining that the generated pairwise key is symmetric with a pairwise key of the second device.

13. The method of claim 10, wherein determining the device specific security parameter associated with the second device comprises: receiving a broadcast message from the second device, the broadcast message comprising the device-specific security parameter associated with the second device.

14. The method of claim 10, further comprising: receiving an updated first group security configuration; and
reestablishing the secure connection for communications with the second device based at least in part on the updated first group security configuration.

15. An apparatus for wireless communication, comprising:
a processor;
memory in electronic communication with the processor; and instructions stored in the memory and operable, when executed by the processor, to cause the apparatus to:
create, by a managing device of a group of devices, a first group security configuration for a first device of the group of devices, the first group security configuration comprising a group security parameter associated with the group of devices and a device-specific security parameter associated with the first device, wherein a combination of the device-specific security parameter associated with the first device and the group security parameter is configured for pairwise key generation for secure connection establishment with the first device;
create, by the managing device, a second group security configuration for a second device of the group of devices, the second group security configuration comprising the group security parameter and a device-specific security parameter associated with the second device, wherein a combination of the device-specific security parameter associated with the second device and the group security parameter is configured for pairwise key generation for secure connection establishment with the second device; and
provide the first group security configuration to the first device and the second group security configuration to the second device, wherein the first group security configuration and the second group security configuration are configured to be used to establish a secure connection for communications between the first device and the second device.

16. The apparatus of claim 15 wherein the first group security configuration and the second group security configuration are configured to be used to establish the secure connection without additional communications with the managing device during the establishment of the secure connection.

17. The apparatus of claim 15, wherein the instructions are operable to cause the apparatus to:
determine a group security level for the group of devices based at least in part on a maximum number of devices in the group of devices.

18. The apparatus of claim 15, wherein the instructions are operable to cause the apparatus to:
update the first group security configuration and the second group security configuration based at least in part on a quantity of devices that change their group connection status exceeding a threshold quantity of devices.

19. The apparatus of claim 18, wherein the instructions are operable to cause the apparatus to:
provide the updated first group security configuration to the first device using a first secure unicast channel; and
provide the updated second group security configuration to the second device using a second secure unicast channel.

20. The apparatus of claim 18, wherein the instructions to update the first group security configuration and the second group security configuration are operable to cause the apparatus to:
change the group security parameter, the device-specific security parameter associated with the first device, or the device-specific security parameter associated with the second device, or a combination thereof.

21. The apparatus of claim 18, wherein the instructions to update the first group security configuration and the second group security configuration are operable to cause the apparatus to:
select a group identifier providing an index to an updated group security parameter, an updated device-specific security parameter associated with the first device, or an updated device-specific security parameter associated with the second device, or a combination thereof; and
provide the selected group identifier to the first device, or the second device, or both the first device and the second device.

22. The apparatus of claim 18, wherein a device changing its group connection status comprises the device being identified as a compromised device, a periodic security configuration update, the device departing from the group of devices, or the device joining the group of devices, or a combination thereof.

23. The apparatus of claim 15, wherein the group of devices comprise a group of sensor nodes, a group of wireless devices forming a wireless peer-to-peer (P2P) network, a group of wireless devices forming a mesh network, or a group of devices forming an infrastructure-less network, or a combination thereof.

24. An apparatus for wireless communication, comprising:

a processor;

memory in electronic communication with the processor; and instructions stored in the memory and operable, when executed by the processor, to cause the apparatus to:

receive, at a first device of a group of devices, a first group security configuration from a managing device, the first group security configuration comprising a group security parameter associated with the group of devices and a device-specific security parameter associated with the first device, wherein a combination of the devices specific security parameter and the group security parameter is configured for pairwise key generation for secure connection establishment with the first device; and establish a secure connection for communications with a second device of the group of devices based at least in part on the first group security configuration and a second group security configuration provided to the second device, the second group security configuration comprising the group security parameter and a device-specific security parameter associated with the second device;

determine, at the first device, the device-specific security parameter associated with the second device, wherein establishing the secure connection is based at least in part on a combination of the device-specific security parameter associated with the first device, the group security parameter. and the device-specific security parameter associated with the second device as determined at the first device.

25. The apparatus of claim 24, wherein the secure connection is established without additional communications with the managing device during the establishment of the secure connection.

26. The apparatus of claim 24, wherein the instructions are operable to cause the apparatus to:

generate a pairwise key based at least in part on the combination of the group security parameter and the device-specific security parameter associated with the first device, wherein establishing the secure connection is based at least in part on determining that the generated pairwise key is symmetric with a pairwise key of the second device.

27. The apparatus of claim 24, wherein the instructions to determine the device-specific security parameter associated with the second device are operable to cause the apparatus to:

receive a broadcast message from the second device, the broadcast message comprising the device-specific security parameter associated with the second device.

28. The apparatus of claim 24, wherein the instructions are operable to cause the apparatus to:

receive an updated first group security configuration; and
reestablish the secure connection for communications with the second device based at least in part on the updated first group security configuration.

* * * * *